US010869576B2

(12) United States Patent
Yaghotian et al.

(10) Patent No.: US 10,869,576 B2
(45) Date of Patent: Dec. 22, 2020

(54) EXPRESS BARBEQUE WITH OFFSET HEAT DISTRIBUTOR AND METHOD OF USING SAME

(71) Applicants: Ehsan Sean Yaghotian, Houston, TX (US); Mohammad Ali Yaghotian, Houston, TX (US)

(72) Inventors: Ehsan Sean Yaghotian, Houston, TX (US); Mohammad Ali Yaghotian, Houston, TX (US)

(*) Notice: Subject to any disclaimer, the term of this patent is extended or adjusted under 35 U.S.C. 154(b) by 0 days.

(21) Appl. No.: 15/989,004

(22) Filed: May 24, 2018

(65) Prior Publication Data
US 2018/0338641 A1 Nov. 29, 2018

Related U.S. Application Data

(60) Provisional application No. 62/510,366, filed on May 24, 2017, provisional application No. 62/525,443, (Continued)

(51) Int. Cl.
*A47J 37/07* (2006.01)
*B23P 19/04* (2006.01)

(52) U.S. Cl.
CPC ....... *A47J 37/0704* (2013.01); *A47J 37/0786* (2013.01); *B23P 19/04* (2013.01); *A47J 2037/0795* (2013.01)

(58) Field of Classification Search
CPC ..... A47J 37/0704; A47J 37/0786; B23P 19/04
See application file for complete search history.

(56) References Cited

U.S. PATENT DOCUMENTS 1,125,075 A * 1/1915 Detwiler ................ F24C 3/085
126/39 D
1,836,894 A * 12/1931 Bedigian ............ A47J 37/0718
126/25 R
(Continued)

FOREIGN PATENT DOCUMENTS

JP         2001000334 A  *  1/2001

OTHER PUBLICATIONS

PCT Notification of Transmittal of International Search Report and The Written Opinion of the International Searching Authority dated Aug. 24, 2018, issued from the International Searching Authority in related PCT Application No. PCT/US1834459, (10 pages).

*Primary Examiner* — Jorge A Pereiro
*Assistant Examiner* — Logan P Jones
(74) *Attorney, Agent, or Firm* — Nolte Lackenbach Siegel

(57) ABSTRACT

An express barbeque for cooking food includes a housing including a base and a lid with a cooking chamber therein. A grill is positionable in the base to support the food, with a food splatter area defined about the grill. Heat distributors are positioned about the cooking chamber offset laterally from the food splatter area. Each of the heat distributors includes a perforated pipe and a corresponding heat diverter. Each of the perforated pipes is shaped to receive heat from a heat source, and each has the corresponding heat diverter positioned thereabout to pass the heat from the perforated pipe through the cooking chamber whereby cooking of the food is facilitated. A cooking drawer may be slidably retractable from the housing. The cooking drawer may include the upper grill and a lower drip tray. The lower drip tray is connected below the grill to catch drippings therefrom.

32 Claims, 20 Drawing Sheets

Related U.S. Application Data filed on Jun. 27, 2017, provisional application No. 62/575,914, filed on Oct. 23, 2017.

(56) References Cited

U.S. PATENT DOCUMENTS

| | | | | |
|---|---|---|---|---|
| 2,891,465 | A * | 6/1959 | Rogge | A47J 37/0688 126/25 A |
| 3,301,172 | A * | 1/1967 | Longo | A47J 37/067 99/401 |
| 3,343,527 | A * | 9/1967 | Manteris | A47J 37/0718 126/163 R |
| 3,572,313 | A * | 3/1971 | Ciancaglini | A47J 37/0718 126/9 R |
| 3,683,791 | A * | 8/1972 | Rast, Jr. | A47J 37/0704 126/25 R |
| 4,002,113 | A * | 1/1977 | McLane | A47J 37/06 99/447 |
| 4,561,419 | A * | 12/1985 | Koziol | A47J 37/0713 126/39 E |
| 4,627,410 | A * | 12/1986 | Jung | A47J 37/041 126/19 R |
| 4,773,319 | A * | 9/1988 | Holland | A47J 37/0713 126/25 R |
| 4,840,118 | A * | 6/1989 | Rinehart | A47J 37/0704 126/25 R |
| 4,850,333 | A * | 7/1989 | Dellrud | A47J 37/0718 126/25 A |
| 5,097,817 | A | 3/1992 | Dodgen | |
| 5,121,676 | A * | 6/1992 | Jurgens | A47J 37/0713 126/25 R |
| 5,163,359 | A * | 11/1992 | McLane, Sr. | A47J 37/0713 126/25 R |
| 5,213,027 | A | 5/1993 | Tsotsos et al. | |
| 5,341,793 | A | 8/1994 | Brown | |
| 5,404,801 | A * | 4/1995 | Holland | A47J 37/0786 126/25 R |
| 5,445,066 | A * | 8/1995 | Rosset | A47J 37/0682 126/39 D |
| 5,878,739 | A | 3/1999 | Guidry | |
| 5,918,536 | A * | 7/1999 | Cheng | A47J 37/0718 126/25 R |
| 6,038,965 | A | 3/2000 | Thorndyke | |
| 6,104,004 | A * | 8/2000 | Ragland | A47J 37/0635 219/386 |
| 6,557,545 | B2 | 5/2003 | Williams | |
| 6,748,940 | B2 * | 6/2004 | Bennett | A47J 37/0682 126/25 R |
| 6,827,076 | B2 | 12/2004 | Crawford et al. | |
| 7,174,885 | B2 * | 2/2007 | Han | A47J 37/067 126/39 B |
| 8,220,449 | B2 * | 7/2012 | Rheault | A47J 33/00 126/25 R |
| 8,347,442 | B2 | 1/2013 | Peacocke | |
| 8,490,614 | B1 | 7/2013 | Gregory | |
| 9,357,880 | B2 * | 6/2016 | Norris | A47J 37/0713 |
| 9,504,354 | B1 * | 11/2016 | Ficarra | A47J 37/0786 |
| 9,788,688 | B1 * | 10/2017 | Ficarra | A47J 37/0713 |
| 9,839,323 | B2 | 12/2017 | Parrish et al. | |
| 2002/0062742 | A1 | 5/2002 | Backus et al. | |
| 2002/0189603 | A1 * | 12/2002 | Hsu | A47J 37/0704 126/25 R |
| 2002/0195096 | A1 * | 12/2002 | Bennett | A47J 37/0682 126/41 R |
| 2004/0011217 | A1 * | 1/2004 | Marson | A47J 37/041 99/419 |
| 2006/0000365 | A1 * | 1/2006 | Attie | A47J 37/0652 99/340 |
| 2006/0042475 | A1 * | 3/2006 | Craig | A47J 37/0786 99/467 |
| 2009/0090348 | A1 * | 4/2009 | Contarino, Jr. | A47J 37/074 126/25 R |
| 2010/0083846 | A1 | 4/2010 | Adams | |
| 2010/0154775 | A1 * | 6/2010 | Robinson | F23D 14/06 126/39 E |
| 2010/0206291 | A1 * | 8/2010 | Axinte | A47J 36/025 126/25 R |
| 2010/0275898 | A1 | 11/2010 | Jansson et al. | |
| 2011/0107923 | A1 * | 5/2011 | Hess | A47J 37/0635 99/422 |
| 2011/0120442 | A1 | 5/2011 | Duncan | |
| 2012/0055464 | A1 | 3/2012 | Kim et al. | |
| 2012/0216686 | A1 * | 8/2012 | Panea | A47J 37/0709 99/450 |
| 2013/0108750 | A1 | 5/2013 | Vitagliano | |
| 2013/0125766 | A1 | 5/2013 | George | |
| 2013/0152803 | A1 | 6/2013 | Patton | |
| 2015/0013662 | A1 * | 1/2015 | Norris | A47J 37/0713 126/25 R |
| 2017/0020336 | A1 * | 1/2017 | Cole | A47J 37/0786 |
| 2017/0164787 | A1 | 6/2017 | Freret | |

* cited by examiner

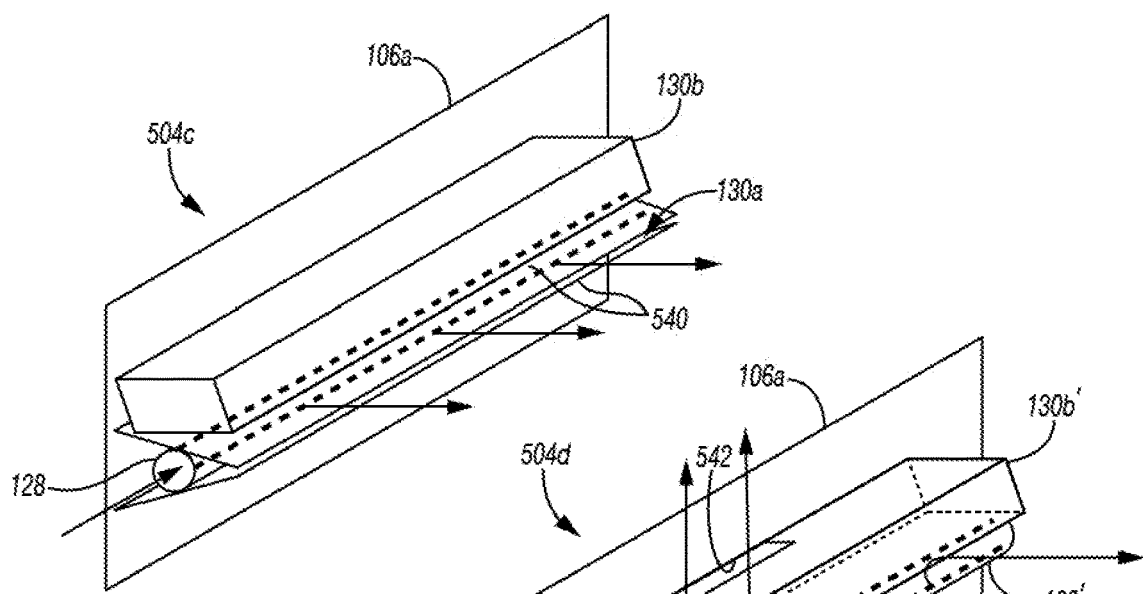
FIG. 5C
FIG. 5D
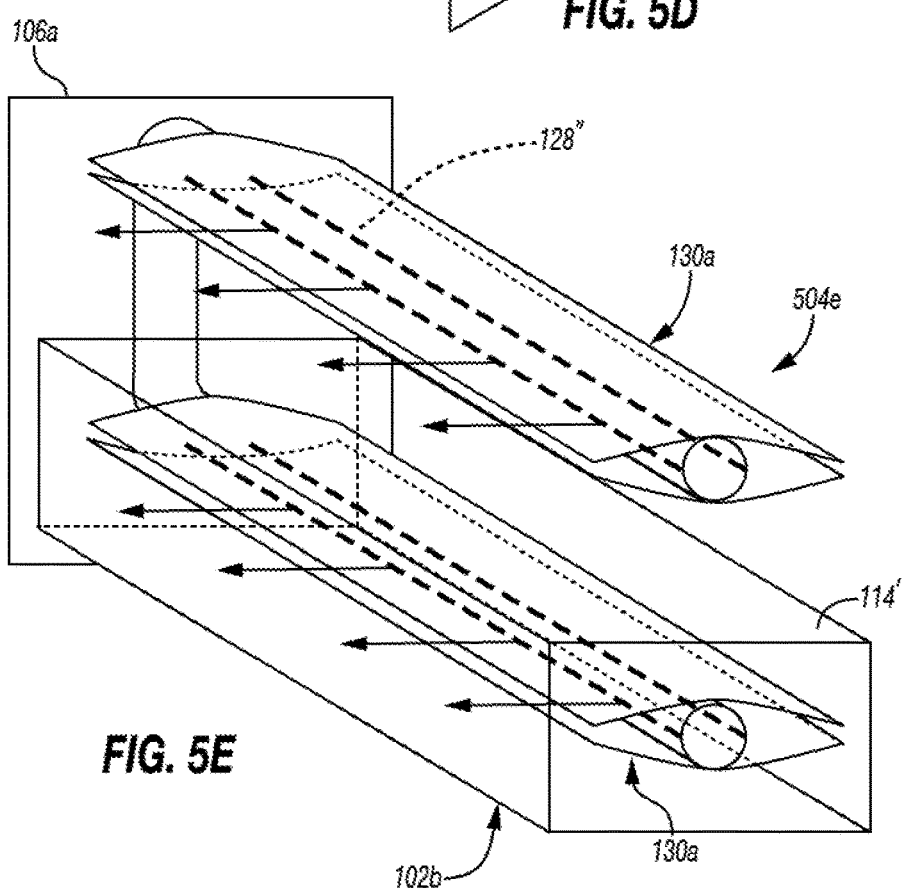
FIG. 5E

EXPRESS BARBEQUE WITH OFFSET HEAT DISTRIBUTOR AND METHOD OF USING SAME

CROSS-REFERENCE TO RELATED APPLICATIONS

This application claims the benefit of U.S. Provisional Application No. 62/510,366, which was filed on May 24, 2017; U.S. Provisional Application No. 62/525,443, which was filed on Jun. 27, 2017; and U.S. Provisional Application No. 62/575,914, which was filed on Oct. 23, 2017, the entire contents of which is hereby incorporated by reference herein.

BACKGROUND

The present disclosure relates generally to cooking technology. More specifically, the present disclosure relates to cooking devices, such as barbeques, for cooking food products.

Cooking devices have been developed to facilitate preparation of food for consumption. Such cooking devices typically include a heating source to apply heat to the raw food and convert the raw food into cooked food. Such cooking devices may include or be connected to fuel or power sources capable of generating the heat needed to cook the food.

Some cooking devices are barbeques that use a flame as the heating source to cook the food. These barbeques have grills to hold the food over the flame. The flame can be generated from a bed of charcoal lit using charcoal fluid. The flame can be positioned under the grill so that the flames generate the heat from underneath the food. The food is rotated during the heating to allow the flame to apply heat to all sides.

Various devices have been developed for barbequing. Examples of barbeque devices are provided in U.S. Pat. No. 6,557,545, U.S. Ser. No. 10/521,1027, U.S. Ser. No. 10/509,7817, US20170164787, US20110120442, US20100275898, US20100083846, US20020062742, U.S. Pat. Nos. 6,038,965, 5,341,793, US20130152083, US20130125766, US20130108750, U.S. Pat. Nos. 9,839,323, 8,347,442, and 6,827,076, the entire contents of which are hereby incorporated by reference herein.

Despite advancements in the cooking technology, there remains a need for providing barbeques capable of efficiently and safely cooking high quality foods. The present disclosure is intended to provide such need.

SUMMARY

In one aspect, the disclosure relates to an express barbeque for cooking food, comprising a housing, a grill and heat distributors. The housing comprises a base and a lid with a cooking chamber defined therein. The base has a front and a rear with sides therebetween. The grill is positionable in the base to support the food. A food splatter area defined about the grill. The heat distributors are positioned about the cooking chamber offset laterally from the food splatter area. Each of the heat distributors comprises a perforated pipe and a corresponding heat diverter. Each of the perforated pipes is shaped to receive heat from a heat source and having the corresponding heat diverter positioned thereabout to pass the heat from the perforated pipe through the cooking chamber whereby cooking of the food is facilitated.

The express barbeque may further comprise a cooking drawer slidably positionable in the housing, the cooking drawer comprising the grill and a drip tray. The grill may be connected a distance above the drip tray by spaced apart front and rear walls.

The perforated pipes are positioned along the sides of the base; along the front, rear, and/or sides of the base; and/or extend laterally from the base above, below, and/or between portions of the grill.

The heat distributors comprise a lid heat diverter, an upper pipe heat diverter, a lower pipe heat diverter, and a lateral heat diverter. The heat diverters have a sidewall with a heat channel therethrough. The heat diverters have an inlet positionable about perforations in the perforated pipe and an outlet a distance from the inlet. At least one of the lid and the drawer comprises a net positionable about the grill. The base has a drip outlet and wherein the express barbeque further comprises a drip receptacle in fluid communication with the drip outlet.

The housing may comprise multiple bases and a dividing wall separating the multiple bases. The Each of the multiple bases may have the same heat distributors or the different heat distributors. The express barbeque may further comprise a charcoal tray positioned in the base. The grill may comprise grill portions with a grill space therebetween, the charcoal tray may be positioned below the grill space, and the lid may comprise a charcoal divider separating the charcoal tray when the lid is in the closed position.

In another aspect the disclosure relates to an express barbeque for cooking food, comprising a housing, a cooking drawer, and heat distributors. The housing comprise a base and a lid with a cooking chamber defined therein. The cooking drawer is slidably retractable from the housing, and comprises an upper grill and a lower drip tray. The lower drip tray is connected below the upper grill to catch drippings therefrom. The heat distributors are positioned about the cooking chamber. Each of the heat distributors comprises a perforated pipe shaped to receive heat from a heat source and a heat diverter positioned about the perforated pipe to pass the heat from the perforated pipe through the cooking chamber whereby cooking of the food is facilitated.

The cooking drawer is slidably positionable about the housing through the front of the base. The front of the base is positioned between a front wall and a rear wall of the cooking drawer. The cooking chamber remains sealed when the cooking drawer is in an open or closed position. The perforated pipes may be in fluid communication with each other or are independently connected to the heat source. The perforated pipes may be adjustably positioned about the base.

Finally, in another aspect, the disclosure relates to a method of assembling an express, comprising: providing a housing with a cooking chamber therein; placing a grill in a housing, the grill having a food splatter area thereabout; and placing a heat distributor in the housing a distance laterally offset from a splatter area, the placing comprising positioning perforated pipes within the cooking chamber and a heat diverter about the perforated pipe for passing heat from a heat source through the cooking chamber. The method further comprises slidably positioning a cooking drawer about the housing and placing the grill in the drawer such that the grill is retractable from the housing while keeping the cooking chamber closed.

BRIEF DESCRIPTION OF THE DRAWINGS

So that the features herein can be understood in detail, a more particular description may be had by reference to the embodiments thereof that are illustrated in the appended drawings. It is to be noted, however, that the examples illustrated are not to be considered limiting of its scope. The figures are not necessarily to scale and certain features and certain views of the figures may be shown exaggerated in scale or in schematic in the interest of clarity and conciseness.

FIGS. 5A-5E are schematic diagrams depicting various configurations of heat distributors for the express BBQ.

DETAILED DESCRIPTION

Figure 1A:
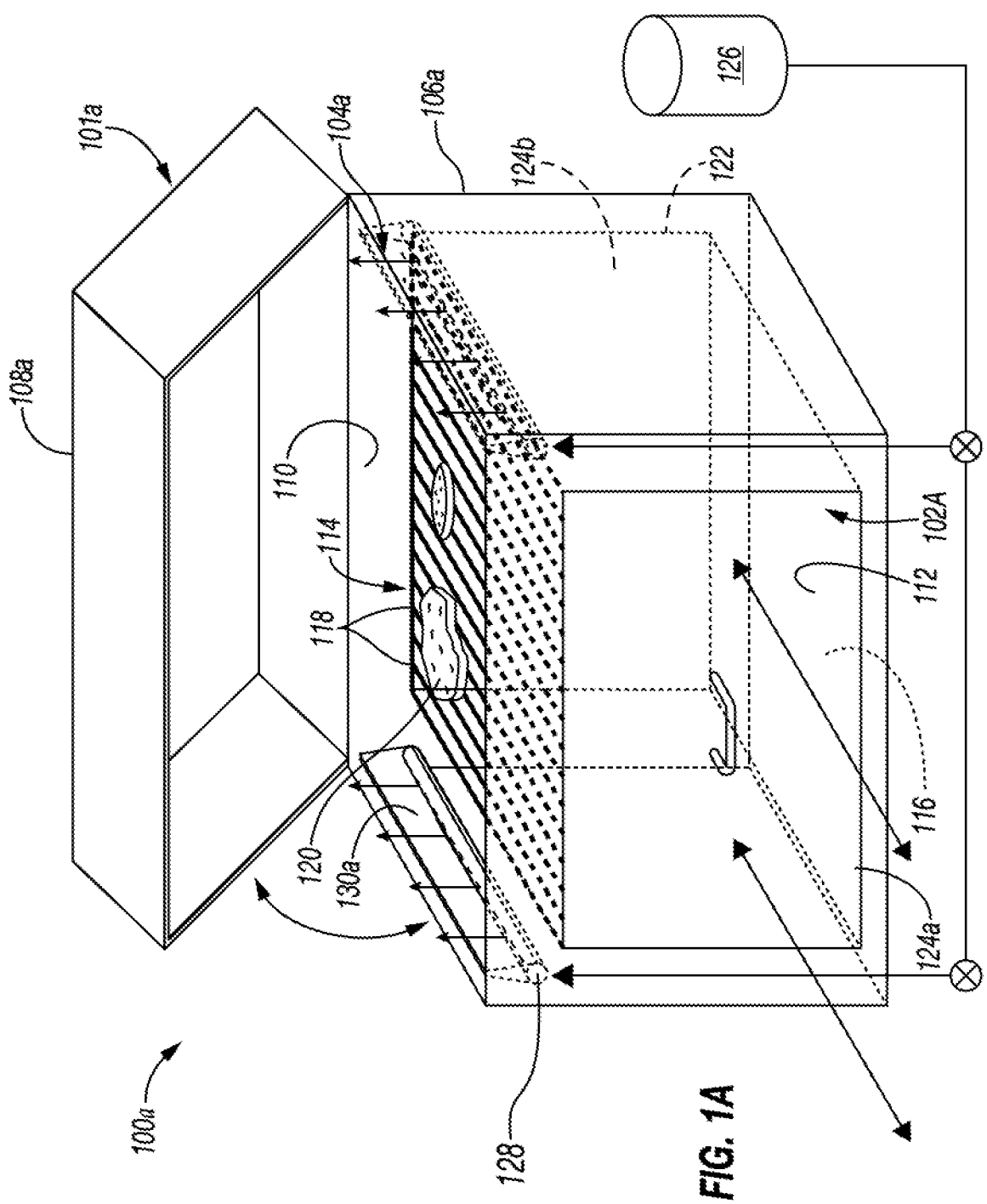
FIGS. 1A-1C are schematic diagrams depicting of various configurations of an express barbeque (BBQ).

In the following description, numerous details are set forth to provide an understanding of the present disclosure. However, it will be understood by those skilled in the art that the present disclosure may be practiced without these details and that numerous variations or modifications from the described embodiments are possible.

The present disclosure relates to a express BBQ for cooking food. The express BBQ has a housing, a drawer, and heat distributors. The housing defines a cooking chamber with the drawer and the heat distributors positioned therein. The drawer is insertable into the housing and includes a multi-level (e.g., two level) structure including a grill (food rack) for supporting the food and a drip tray connected below the food rack that are removable from the housing together. The housing and the drawer may be shaped such that the housing remains sealed to retain heat in the cooking chamber as the drawer is opened to access the grill and the drip tray.

The heat distributors may be positioned along the housing a distance from (e.g., offset from) a splatter area where splatter, drippings, fluids, particles and/or portions of the food may be released. The positioning of the heat distributors may be used to provide a splatter-free and smoke-free cooking configuration. The heat distributor includes perforated pipes and heat diverters. The perforated pipes are positioned about the housing to pass heat from a heat source into the housing. The heat diverters are positioned about the perforations to direct heat exiting the perforations through the housing.

The position of the heat diverters may allow for a "top and bottom heat (fire) system". The heat distributor may circulate the heat through the housing and around the food for even distribution and/or faster cooking. The position of the heat diverters may be at a location away from the food, thereby preventing the food from contacting, splattering, and/or releasing food drippings (e.g., juice, water, grease, etc.) onto the heat diverters. This position may provide "smoke free" (or resistant) capabilities. These smoke free capabilities may also be provided by an enclosed cooking chamber within the housing, a net (or mesh) positioned about (e.g., above and/or below) the food, and a dripping tray below the food that may be provided with water or aluminum to enable the drippings to evaporate and disappear.

The express BBQ may be provided with various options and/or configurations that may facilitate the cooking process. For example, the positioning of the heat distributors about the cooking chamber (e.g., above and below the grill) may be used to distribute heat that surrounds the food, thereby providing faster cooking and/or eliminating the need to turn (flip) the food during cooking. Flip-less (or no flip or non-flip) means that there is no need to rotate or flip the food because it cooks from both sides simultaneously. By eliminating the requirement that the food be flipped during cooking, the express BBQ may be used in a flip-less cooking operation. The express BBQ may be of a small size and/or usable in homes, apartments, or other facilities. The cooking chamber may be isolated so that users are not exposed to the food, drippings, splatter, smoke, heat, hot parts, and/or other items within the cooking chamber.

The express BBQ may be provided with various options and features. For example, the express BBQ may include one or more of the following features: a lid (top cover) to distribute the heat on top of the food, upper and lower nets to apply grid lines and/or to isolate food from heat distributors (e.g., pipes), a disposal channel at an angle to direct waste (e.g., the drippings) from the drawer and out of the cooking chamber when the drawer is in any position (e.g., within or retracted from the housing), a drawer with a grill (food tray) closable in the housing to cook evenly, a retractable drawer that is secured to the housing, an enclosed cooking chamber that stays closed and secures heat inside even when the grill moves to an open position to access the food, a drawer with a grill and integral dripping tray below the grill to collect drippings, double controlled heat system with upper and lower heating chambers independently configurable and/or controllable, heat diverters on the pipes to direct the heat for even and/or selective distribution, a heat chamber with heat (fire) isolated therein away from users, heat distributors positioned a distance (e.g., 2 inches) from a wall of the housing away from food, a housing with an enclosed cooking chamber to keep heat from exiting when the drawer opens and closes, a grill located on the drawer in the housing in a concentrated area surrounded by the heat diverters, an upper net positioned above the food to direct and distribute heat evenly to the food, lower pipes in a bottom portion of the cooking chamber along the wall of the housing to a side of the food (offset), heat distributors positioned closer to the food to decrease cooking time, cooking chamber and heat diverters sized to provide efficient cooking, a lid with a lid heat diverter to redirect heat and prevent heat in upper portion of the housing from burning the food.

"Express" as used herein refers to the enhanced cooking functions of the BBQ, such as increasing cooking speed by distributing heat through the cooking chamber, configuring cooking chamber size and/or heat distribution to the food (e.g., size, amount, type, etc.), isolating heat within the cooking chamber, configuring heat distribution for directing heat about desired portions of the cooking chamber, offsetting heat distributors about the food to facilitate cooking (e.g., faster cooking time) and/or cleanup (e.g., less splatter mess), cooking without requiring flipping, avoiding splatter onto heat distributors, retaining moisture within the food, enhancing the quality of the food (e.g., tenderness, moisture, isolated from contamination), etc. The express BBQ may have, for example, one or more of the cooking functions, among others: flip-less (no turning) of the food during cooking, express (e.g., high speed) cooking, splatter-free and/or smoke-free cooking, a sealed cooking chamber, a retractable drawer, a drip tray, removable components (e.g., for cleaning), easy cleaning, adjustable heating and/or cooking levels, configurable cooking chambers (e.g., one or more heating chambers), separable cooking chambers for isolated cooking (e.g., reduced size for cleaning, reduced fuel use, separate chambers for different foods, etc.), optional lid/door, adjustable height cooking levels, isolated and/or sealed cooking chamber during cooking and/or when food is accessed; drain and/or drain channel, heat source options (e.g., gas, propane, coals, electrical, infrared, etc.), modular and/or replaceable components, various pipe placement, a lid net, mobility, smoke prevention and/or containment, no requirement to flip during cooking, fast cooking time (e.g., about 7 min for foods), reduced smoke, enclosed chamber with internal cooking drawer and tray, cleaning tray for waste, and connected dual drawer with integrated cooking and waste tray, enhanced taste and quality of cooked foods, retained moisture in cooked foods, reduced fuel due to reduced cooking time, retractable door while cooking chamber remains closed, isolation of heat within cooking chamber when door is open, enhanced safety with enclosed chamber even when drawer retracted to access food, etc.

Configurations of the Express BBQ

Figure 1B:
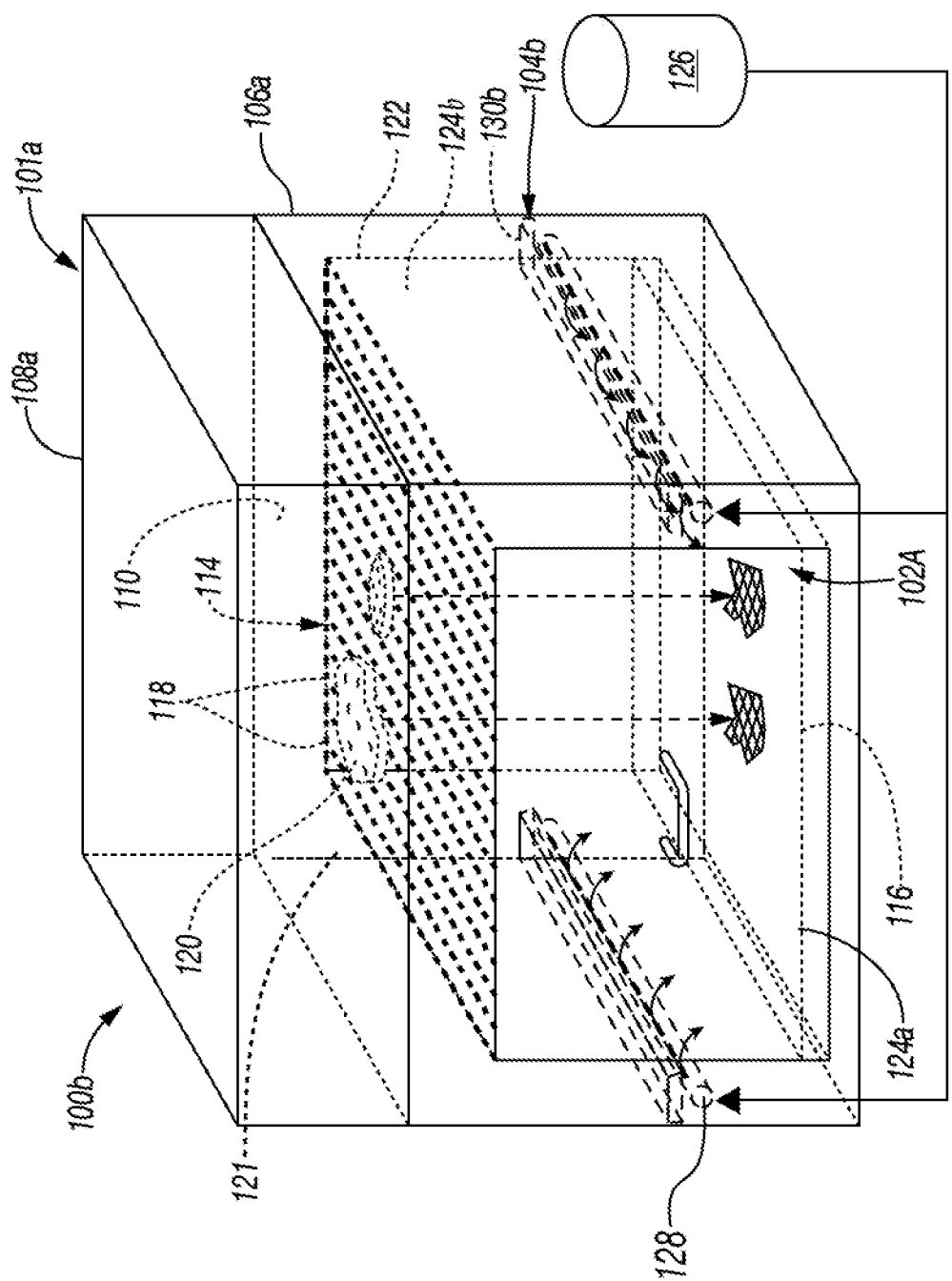
Figure 1C:
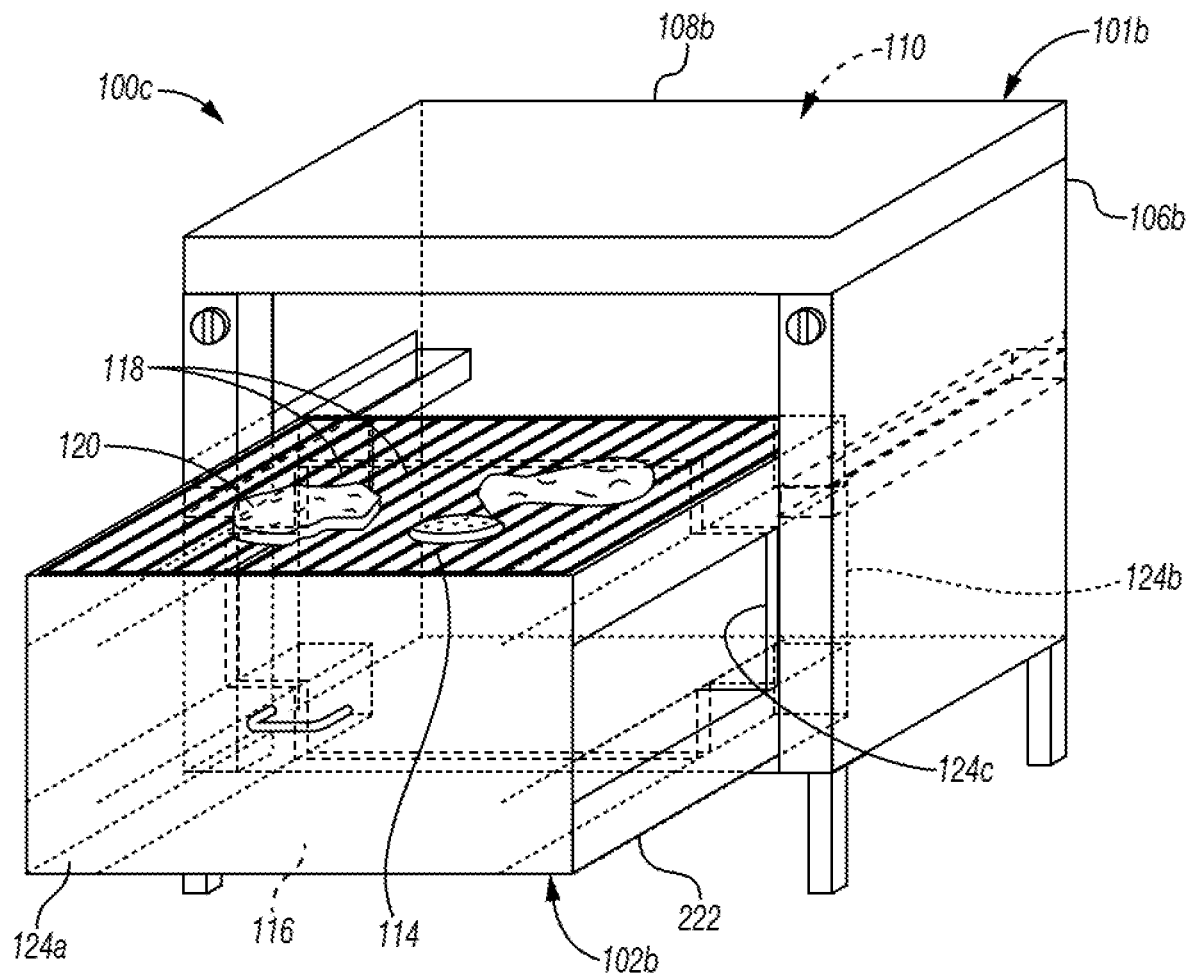

FIGS. 1A-1C show an example express BBQ 100a, b, c. Each of the express BBQs 100a, b, c includes a housing 101a, b, a drawer 102a, b, and heat distributors 104a, b. For clarity, the heat distributors 104a, b are not shown in FIG. 1C, but may optionally be provided. The housings 101a, b, c includes a base 106a, b with a lid 108a, b. The lid 108a, b is pivotally connected to the base 106a, b to define a cooking chamber 110 therein. FIG. 1A shows the express BBQ 100a with the lid 108a open and the drawer 102a closed. FIG. 1B shows the express BBQ 100b with the lid 108a closed and the drawer 102a closed. FIG. 1C shows the express BBQ 100c with the lid 108b closed and the drawer 102b open.

Referring first to FIGS. 1A-1B, the drawer 102a is slidably positioned in an opening 112 in the base 106a as indicated by the arrows. The drawer 102a includes a grill 114 supported above a drip tray 116. The grill 114 may be a conventional grill (or net) having metal rods (or wires or other structures) 118 capable of supporting food 120 thereon. The grill 114 may support a variety of foods, such as meat, vegetables, breads, and combinations thereof, etc. The rods 118 may be spaced apart a distance sufficient to support the food 120 during cooking, and sufficient to allow moisture to drop from the food 120 during cooking. A splatter area 121 may extend about the grill 114 where drippings (e.g., splatter, drippings, fluids, particles, etc.) emitted from the food 120 during cooking may fall. Various configurations of the grill 114 may be provided having uniformly spaced rods, or spaces defined between sections of the grill 114 as is described further herein.

The drip tray 116 is positioned below the grill 114 to capture drippings (e.g., moisture, splatter, water, and/or particles) released from the food 120 during cooking as schematically shown in FIG. 1B. The drip tray 116 may be a metal or metal lined surface shaped to receive the drippings. Optionally, the drip tray 116 may be lined with foil or other material to capture the drippings. The drip tray 116 may also be filled with water to evaporate the drippings.

The grill 114 and the drip tray 116 may be connected together by vertical supports, such as front and rear panels 124a, b to support the grill 114 a distance above the drip tray 116. Optionally, the vertical supports 122 may include vertical beams 222 connected between the grill 114 and the drip tray 116. The front panel 124a may be used to close the opening 112 of the base 106a during cooking. The rear panel 124b may be used to close the cooking chamber 110 when the drawer 102a is pulled out to an open position as is described more fully herein.

The heat distributors 104a, b are positioned about the housing 101a to pass heat from a heat source 126 into the cooking chamber 110. The heat source 126 may be any heat source capable of generating heat, such as propane, gas, fire, electricity, infrared, etc. The heat from the heat source 126 may be passed to the heat distributor 104a, b via flowlines with or without valves. As shown, the heat distributor 104a, b includes perforated pipes 128 and heat diverters 130a, b positioned in the base 106a. The perforated pipes 128 are coupled to the flowlines and shaped to receive the heat from the heat source 126. The perforated pipes 128 are positioned about the grill 114 to pass the heat into the cooking chamber 110 as indicated by the arrows.

In the example of FIG. 1A, the perforated pipes 128 are positioned in an upper portion of the cooking chamber 110 above the grill 114. The upper heat distributors 104 also include upper heat diverters 130a positioned about the perforations in the perforated pipes 128 to define a pathway to direct the heat through the cooking chamber 110. The upper heat diverters 130a may be, for example, flat metal portions positioned at an angle about the perforated pipes 128 to define a tapered outlet for releasing heat into the cooking chamber 110. The tapered outlet is directed upwards into the lid 108a of the housing 101a thereby directing the heat above the food 120 as is described further herein.

In the example of FIG. 1B, the perforated pipes 128 are positioned in a lower portion of the cooking chamber 110 below the grill 114. These lower heat diverters 130b are positioned about the perforations in the perforated pipes 128 to define a pathway to direct the heat through the cooking chamber 110. The lower heat diverters 130b may be, for example wooden and/or metal beams positioned along a side of the base 106a below the grill 114 to define a barrier to redirect heat from the perforations into the cooking chamber 110. The barrier is positioned to redirect heat below the grill 114 thereby directing the heat below the food 120. Optionally, the upper heat diverter 130a may also be positioned about the perforated pipes 128 of the lower heat diverter 130b as is described more fully herein.

In the version of FIG. 1C, the housing 101b has a front 124c on a front side thereof that is positioned between the front and rear panels 124a, b of the drawer 102c. The drawer 102c has horizontal supports 222 that extend through the front 124c with the front and rear panels 124a, b connected to the horizontal beams on either side of the front 124c. The drawer 102c is slidably positionable about the front 124c such that, when the drawer 102b is opened, the cooking chamber 110 remains closed to restrict heat and/or steam from releasing from exiting. As also shown in this version, the lid 101b has a different shape including a flat top with a front portion that extends over a portion of the front side of the base 106b as is described further herein.

While FIGS. 1A-1C show example configurations of the express BBQ 100a, b and its components, other variations of the express BBQ may be provided as described further herein. While certain shapes, sizes, arrangements, and/or configurations of the express BBQ is depicted herein, it will be appreciated that variations may be provided. For example, various components of the BBQ grill described herein may be combined in various arrangements about the express BBQ. In another example, the BBQ and/or its components may have various shapes and/or sizes and is not limited to the shapes and/or dimensions depicted. The examples shown and/or described are not intended to be limiting examples and variations may be provided.

Figure 2:
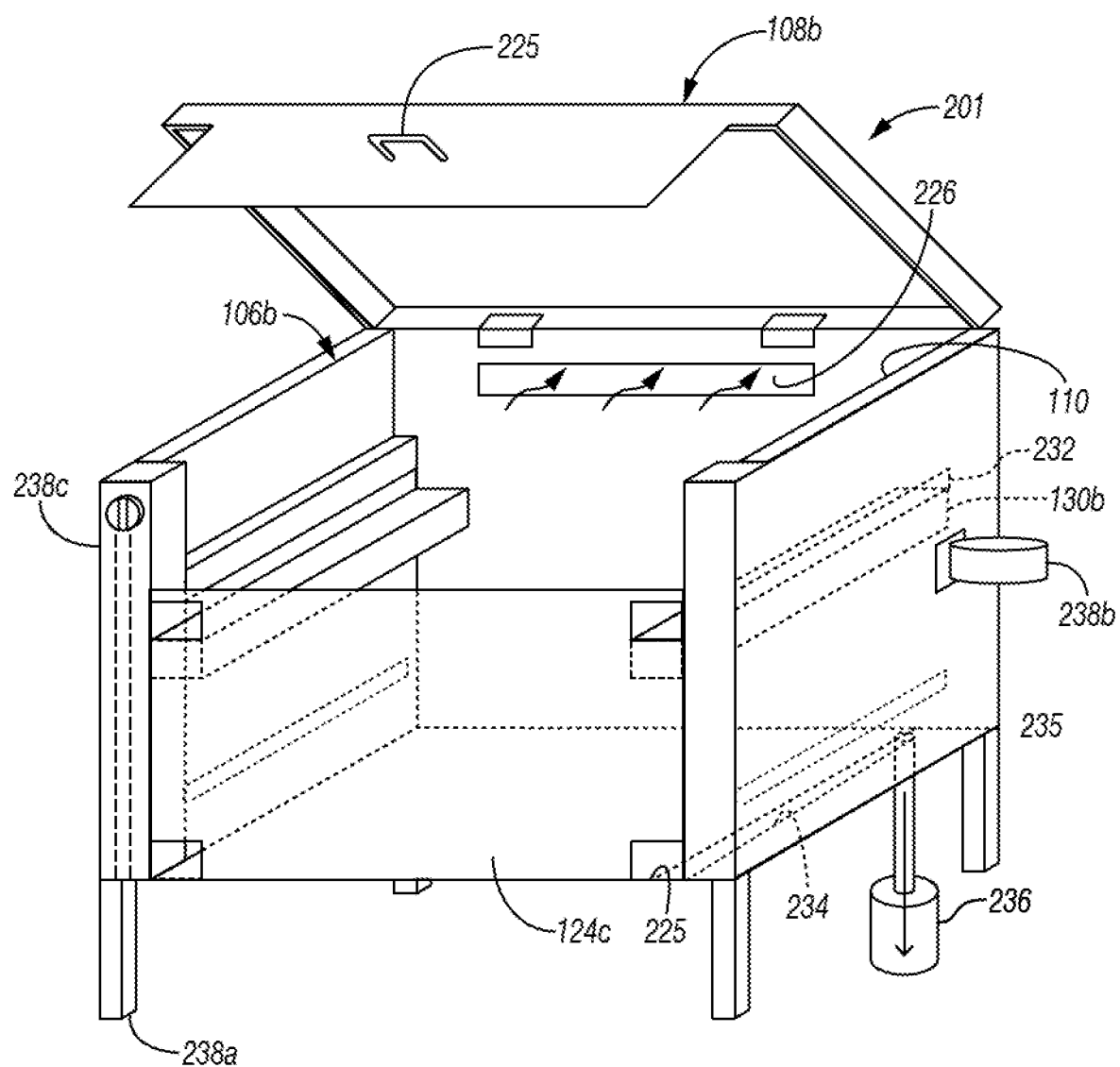
FIG. 2 is a schematic diagram of an example housing for the express BBQ.

FIG. 2 shows an example housing 201 usable with the express BBQ 100c. The housing includes the lid 108b and the base 106b. The lid 108b in this example is hingedly connected to the base 106b to define the cooking chamber 110 therein. The lid 108b has a top portion with a front overhang to cover a top portion of the base 106b. A handle 325 is provided to assist in lifting the lid 108b.

The base 106b is a box-shaped member with an open top and a partially open front. The base 106b has a back vent 226 to release heat, and the lower heat diverters 130b are positioned along an inner surface of the base 106b. The base 106b is also provided with drawer supports 232 (e.g., rails) to slidingly receive the drawer 102 (FIG. 3). A drip channel 234 with a drip outlet 235 leading to receptacle 236 is provided along a bottom of the base 106b to receive drippings from cooked food.

In this version, the opening 112 of FIGS. 1A and 1B has been replaced with the front 124c having openings 225 to receive portions of the drawer 102b as described further herein. Other optional features may be provided, such as legs 238a, a canister clamp 238b to support a tank (e.g., propane tank), a support arm 238c for receivingly supporting flowlines from the heat source 126 and supporting control knobs for varying the heat. Other features not shown may be provided, such as wheels, locks, lid supports, etc.

Figure 3A:
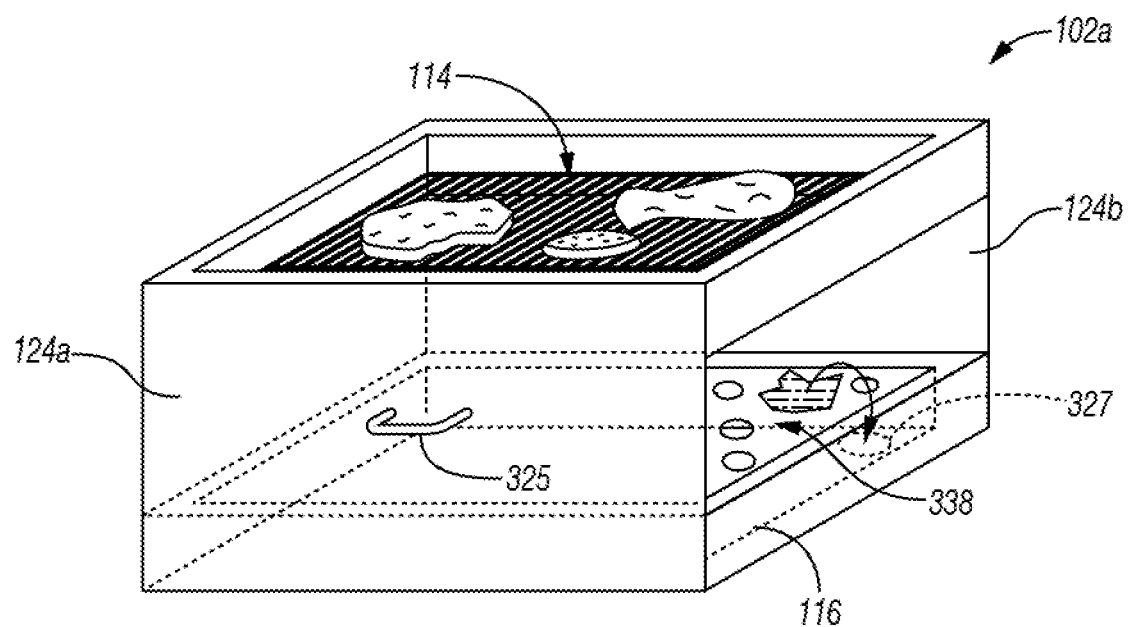
FIGS. 3A and 3B are schematic diagrams of an example grill drawer for the express BBQ.
Figure 3B:
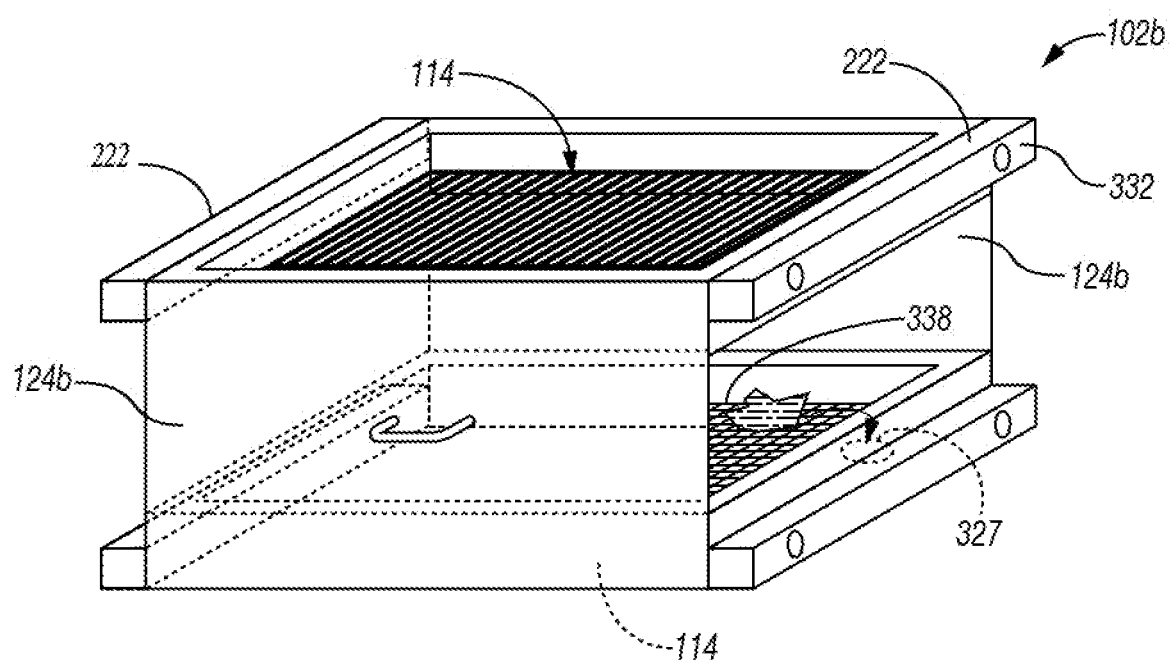

FIGS. 3A-3B show example configurations of the drawers 102a, b. The drawers 102a, b may include the grill 114, the drip tray 116, the front panel 124a, and the rear panel 124b. The drawer 102a includes a handle 325 and a drawer outlet 327 aligned with the drip channel 234 (FIG. 2) to pass drippings from the drip tray 116. As the drawer 102a slides between an opened and closed position, the drawer outlet 327 remains in a position along the drip channel 234 to pass drippings to the drip channel 234.

FIG. 3B shows an example drawer 102b usable with the closed base 106b of FIG. 2. In this example, the drawer 102b has horizontal supports (beams) 222 secured between the front and rear panels 124a, b. The horizontal supports 222 are receivingly positionable in the openings 225 of the base 106b (FIG. 1C). The drawer 102b is positionable in the base 106b with the front panel 124a on one side of the front 124c and the rear panel 124b positioned on the other side of the front 124c.

As shown in FIGS. 1C, 2, and 3B, the horizontal supports 222 may extend through the front 124c to connect the front and rear panels 124a. In this configuration, as the drawer 102 is pulled to the open position to access the grill 114, the front panel 124a moves away from the front 124c and the rear panel 124b moves toward an opposite side of the front 124c.

The drawer 102b may be provided with other features, such as rails 332 and a net (mesh) 338. The drawer 102b also has drawer rails (or sliders) 332 positioned along the horizontal supports 222. The rails 332 may be positioned along the horizontal supports 222 and slidingly and/or matingly engage the drawer supports 232 (FIG. 2) to provide sliding drawer movement therebetween. The net 338 is positioned in the drip tray 116 of the drawer 102b. As also shown in this version, the grill 116 may have various shapes or configurations.

Figure 4:
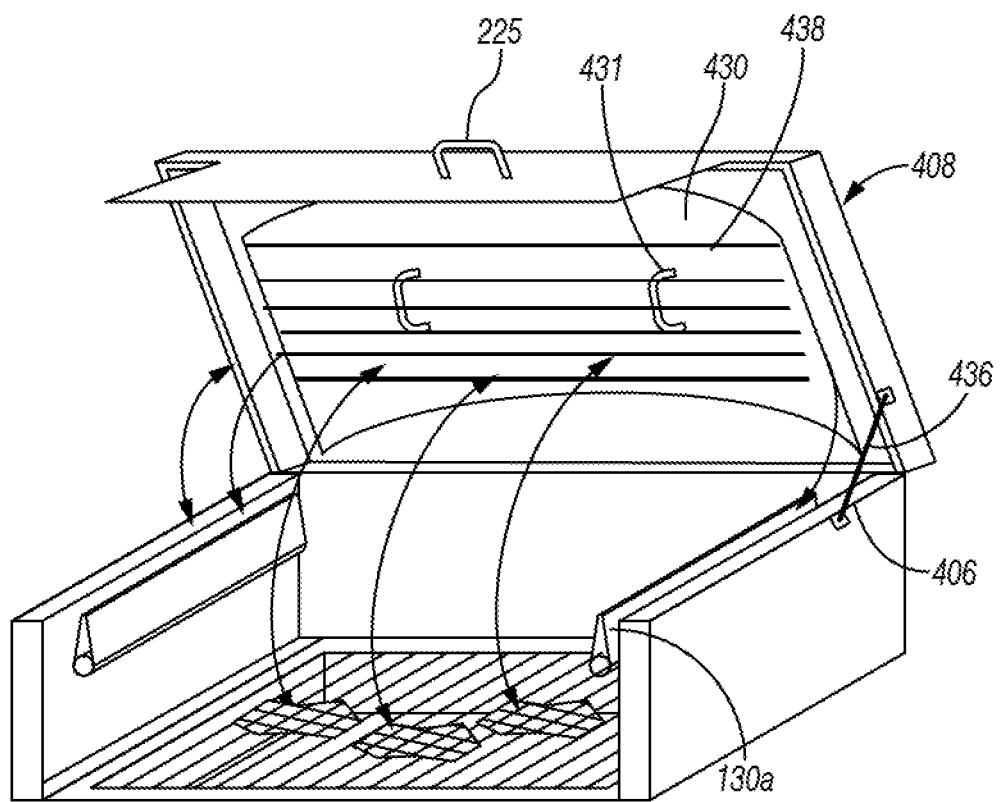
FIG. 4 is a schematic diagram depicting an example lid for the express BBQ.

FIG. 4 shows a detailed view of an example lid 408. The lid 408 is shown as having a cuboid shape with the handle 325 on a front portion thereof. The lid 408 is hingedly connected to the base 406, but may be connected by other means. A lid support 436, such as a slider or a hydraulic lift, may be provided to facilitate lifting of the lid and/or supporting the lid 408 in the open position.

As shown in this view, the lid 408 may be provided with a lid heat distributor 430 positioned on an inner surface of the lid 408. The heat distributor 430 may be fixedly or removably fastened to the lid 408 using various means, such as welding, connectors (e.g., bolts), etc. The lid heat distributor 430 may be a metal surface shaped to engage the upper heat diverter 130a in the base 406 (which may be the base 106a, 106b, or other base). The lid heat distributor 430 may also have a curved portion between the curved ends to facilitate heat flow as described further herein.

As also shown in this view, the lid 408 may be provided with a net 438. The net 438 is shown connected to the lid heat distributor 430 by connectors 431. The net 438 may be fixedly and/or removably connected to the lid 408 and/or the heat distributor 430. The net 438 may be adjustably positioned above the grill 114 to engage the food 120. The net 438 may be, for example, a metal sheet with openings to allow air flow therethrough. The net 438 may have openings of various shapes and sizes, such as a grid or perforated pattern.

As shown by the pattern depicted, the net 438 may be a metal material engageable with the food to apply grill lines to the food 120. The net 438 may have various patterns and/or dimensions for applying desired pressure and/or heat to the food 120. Optionally, the pressure may be sufficient to compress the food and/or release fluids therefrom. Also, the net 438 may have sufficient openings to allow heat flow while protecting the food from exposure to too much heat, thereby preventing burning of the food.

FIGS. 5A-5E depict example configurations of the heat distributors 504a-e. In each of these examples, heat is passed through perforated pipes 128 as indicated by the arrows. The various heat diverters 530a-e steer heat exiting the perforated pipes 128 in a desired direction to circulate heat through the cooking chamber 110. The pipe 128 may be a tubular member, such as a metal or heat tolerant conduit positionable in the cooking chamber 110 and capable of passing heat from the heat source therethrough.

Figure 5A:
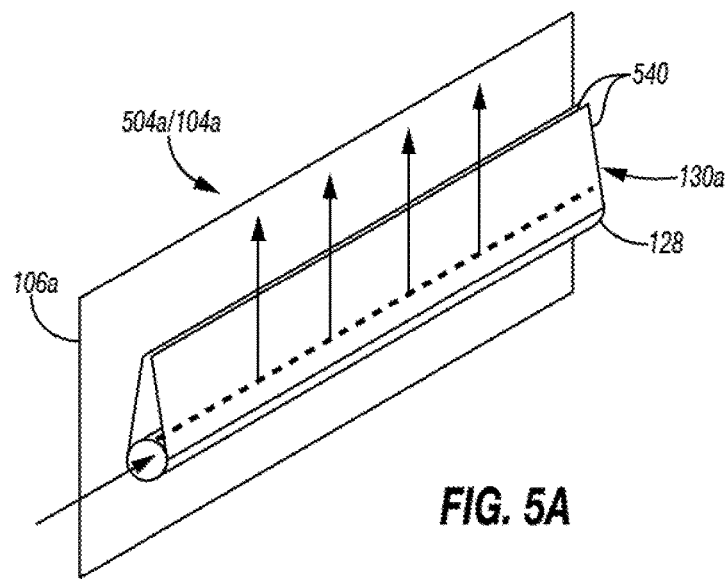

The heat distributor 504a of FIG. 5A is similar to the upper heat distributor 104a of FIG. 1A with the perforated pipe 128 positioned along a wall of the base 106 and the perforations pointed upwards. As shown in this view, the heat distributor 504a includes a pair of metal plates 540 connected together at an angle to form the heat diverter 130a. The metal plates 540 may be joined by side pieces or connectors. The metal plates 540 are positioned about the perforated pipe 128 and shaped to define a nozzle for directing the heat through the cooking chamber. A bottom inlet defined between the metal plates 540 is positioned about the perforations in the perforated pipe 128 to receive the heat therethrough. The metal plates 540 are tapered to define a narrow outlet a distance from the perforated pipe 128 to release the heat therethrough as indicated by the arrows.

Figure 5B:
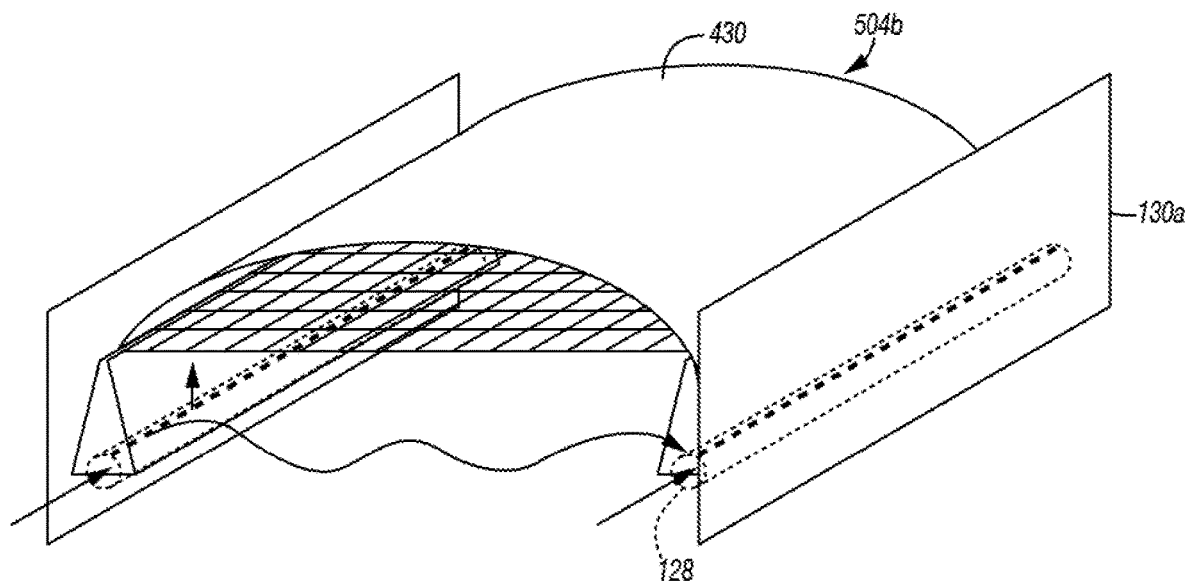

The heat distributor 504b of FIG. 5B includes the heat distributor 430 of FIG. 4 and the heat distributor 504a of FIG. 5A which distributes heat to an upper portion of the cooking chamber 110 (FIG. 1A). The heat distributor 430 is shown with the curved edges positioned along an outer surface of the metal plates 540 of the heat distributor 504a.

The lid heat distributor 430 has ends that are curved to slidingly engage the angled portions of the upper heat diverter 130a when the lid is closed as indicated by the curved arrows. The metal of the lid heat distributor 430 may be thin and bendable to conform to the upper heat diverter 130a for slidingly engagement therewith. Heat exiting the heat distributor 504a passes along a bottom surface of the heat distributor 430 and is circulated through an upper portion of the base 106a. This provides a direct flow of heat above the grill 114 and over the food 120.

The heat distributor 504c of FIG. 5C is similar to the lower heat diverter 130b of FIG. 1B which distributes heat to a lower portion of the cooking chamber 110. As shown in this view, the heat distributor 504b includes the lower heat diverter 130b positioned above the perforated pipe 128 along a wall of the base 106a. The perforated pipe 128 is positioned below the lower heat diverter 130b with the central perforations pointed inward towards a center of the base 106a. The upper heat diverter 130a is positioned about the perforated pipe 128. In this case, the upper heat diverter 130a is positioned horizontally in alignment with the perforations of the perforated pipe 128 to direct heat towards the center of the base 106a as indicated by the arrows.

The heat distributor 504d of FIG. 5D is similar to the lower heat diverter 130b of FIG. 5C, except with the ability to distribute heat to upper and lower portions of the cooking chamber 110. In this case, a portion of the heat diverter 130b acts as a barrier blocking upward flow of the heat, thereby redirecting the heat to pass towards a center of the base 106a. As heat exits the perforated pipe 128, the heat is pushed out towards the center of a lower portion of the base 106a and rises towards the heat diverter 130b. This version operates similar to the heat diverter 130b which allows heat to pass from the central perforations towards the center of the lower portion of the base 106a.

This version also allows heat from the heat diverter 130b' to pass from the upper perforations of the perforated pipe 128' through the heat passage 542 and towards an upper portion of the base 106a. An additional heat passage 542 is provided through the heat diverter 130b' to define a modified lower heat diverter 130b. The perforated pipe 128 has also been provided with an additional set of perforations along a top of the perforated pipe 128, thereby defining a modified perforated pipe 128'. Heat from the upper perforations passes through the passage 542 and to the upper portion of the cooking chamber 110. The heat distributor 130a may also be provided about the perforations on the side of the perforated pipe 128' as needed.

The heat distributor 504e of FIG. 5E includes modified perforated pipes 128" positionable about the drawer 102a, b to distribute heat through upper and lower portions of the cooking chamber 110 and in both directions as indicated by the arrows (FIGS. 1A-1C). A vertical portion of the perforated pipe 128" may be positioned vertically along a wall of the base 106a, b. The vertical portion may be positioned along the wall of the base 106a, b in a desired location for distributing heat in desired areas.

A lateral portion of the perforated pipe 128" may extend a distance from the wall the base 106a, b. The position and distance of the lateral portion may be selected to extend the heat distribution to desired areas in the cooking chamber 110. For example, it may be desired to place the perforated pipes 128" between portions of the grill 114 with the food 120 to prevent contact with the food 120 and/or to prevent drippings from dropping onto the pipe (which may cause smoke). A heat diverter, such as the heat diverter 130a of FIG. 5A, may be positioned about the pipe 128" to direct heat from the perforations as indicated by the arrows.

Figure 6:
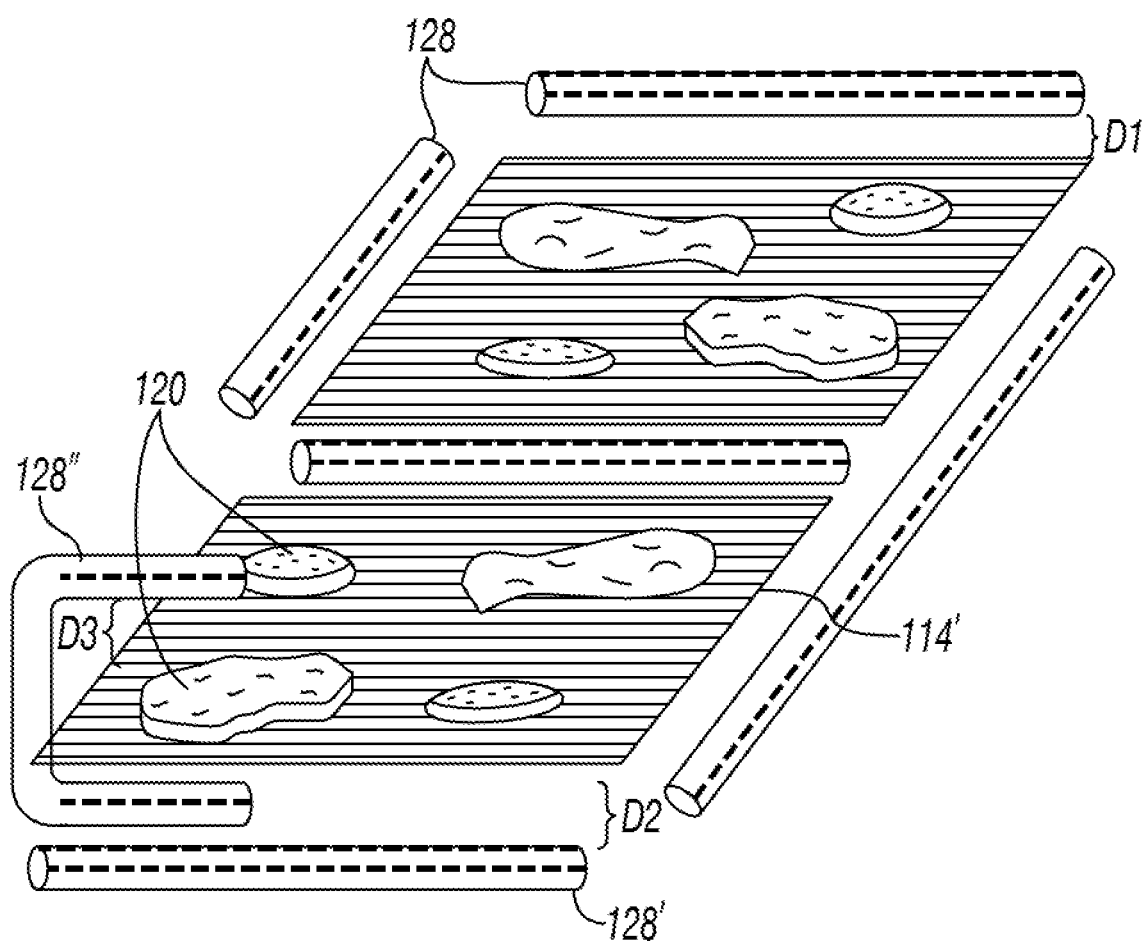
FIG. 6 is a schematic diagram depicting various positions of the heat distributors.

FIG. 6 shows examples of placement of the perforated pipes 128, 128', 128" about the grill 114. As shown in this view, one or more perforated pipes may be placed about the grill 114 as desired to facilitate cooking. As also shown in this view, the grill 114 may have various configurations, such as one or more cooking sections with or without one or more perforated pipes 128, 128', 128" positioned thereabout.

While not shown, one or more of the heat diverters 130a-c may be used with one or more of the perforated pipes 128, 128', 128". Using various combinations of the heat diverters 130a-c and/or perforated pipes 128, 128', 128", various configurations of one or more of the heat distributors (e.g., 430, 540a-e) may be positioned about the grill 114, drawer 102a, b, and/or cooking chamber 110a, b.

The perforated pipes 128, 128', 128" and/or heat diverters 130a-c may be positioned along a wall of the base 106a offset from the grill 114' to avoid the splatter area 121, and a distance from the grill 114' sufficient to apply a desired amount of heat to the food 120 thereon. In an example (not intended to be limiting), the upper heat distributor 540a (FIG. 5A) may be positioned a distance D1 (e.g., about 7 cm) above the grill 114, the lower heat distributor 540c, d (FIGS. 5C and 5D) may be positioned a distance D1 (e.g., about 7 cm) below the grill 114, and the heat distributor 540e may be positioned a distance D1 (e.g., about 7 cm) above and below the grill.

Examples of the Express BBQ (Designs 1-8)

Examples of the express BBQ are provided to show the express capabilities, including capabilities which allow cooking with no need to rotate or flip the food because it cooks from both sides simultaneously using a "top and bottom heat system". These configurations also seek to provide "faster cooking time" at a reduction in time with a range of cooking time (e.g., from about 3 to about 10 minutes for foods) to increase cooking speeds to be faster than conventional barbeque products.

These configurations also seek to provide "smoke free" cooking to reduce the smoke by from about 70 to about 90% (and in some cases no smoke at all) due to the distribution of heat by the housing (e.g., frame and lid) designs, heat distributor design, grill and/or net design, and/or the drawer design (e.g., with water or aluminum in the lower drip tray). The drawer design may have a dual purpose to cover the bottom drip tray below the grill with water or aluminum in it. Putting water in the drawer may be used to reduce the amount of smoke coming out because the drippings (e.g., juice/water/grease) of the food being cooked drops into the water so it evaporates and disappears. Also, the drawer can have aluminum placed in it, which allows the drippings to fall on the aluminum so it can easily be thrown out after use.

FIGS. 7A-7K show various designs of the express BBQs 700a-k. For descriptive purposes, portions of the housing of the express BBQ, such as the front and side panels, and/or portions of the drawers of the express BBQ, such as the front and rear panels and side rails, have been removed to show internal portions, such as the heat distribution features, of the express BBQ. However, it will be appreciated that the express BBQs 700a-k of FIGS. 7A-7K may have features and/or portions of the housing and drawer configurations as shown in other figures herein.

As shown by FIGS. 7A-7K, the express BBQ may have various design configurations (e.g., multiple size, frame designs, functional abilities, etc.) to provide one or more of the capabilities as explained further herein. FIGS. 7A-7G show a first set of designs of the express BBQ 700a-g for cooking the food 120. FIGS. 7H-7K show a second set of designs of the express BBQ 700*h-k*. Each of the express BBQs of FIGS. 7A-7K show portions of the housing 701 including the lid 708*a* and the base 706*a* (with portions removed), the drawer 702*a* including the grill 114 and the drip tray 116, and various configurations of the heat distributors 704*a-k*. Other features are also provided as described further below. Each design may also have the "no-flip" concept with "heat (temperature/fire) control design" where there is no need to flip or touch the food 120 causing it to cook from both the top and/or bottom.

Figure 7A:
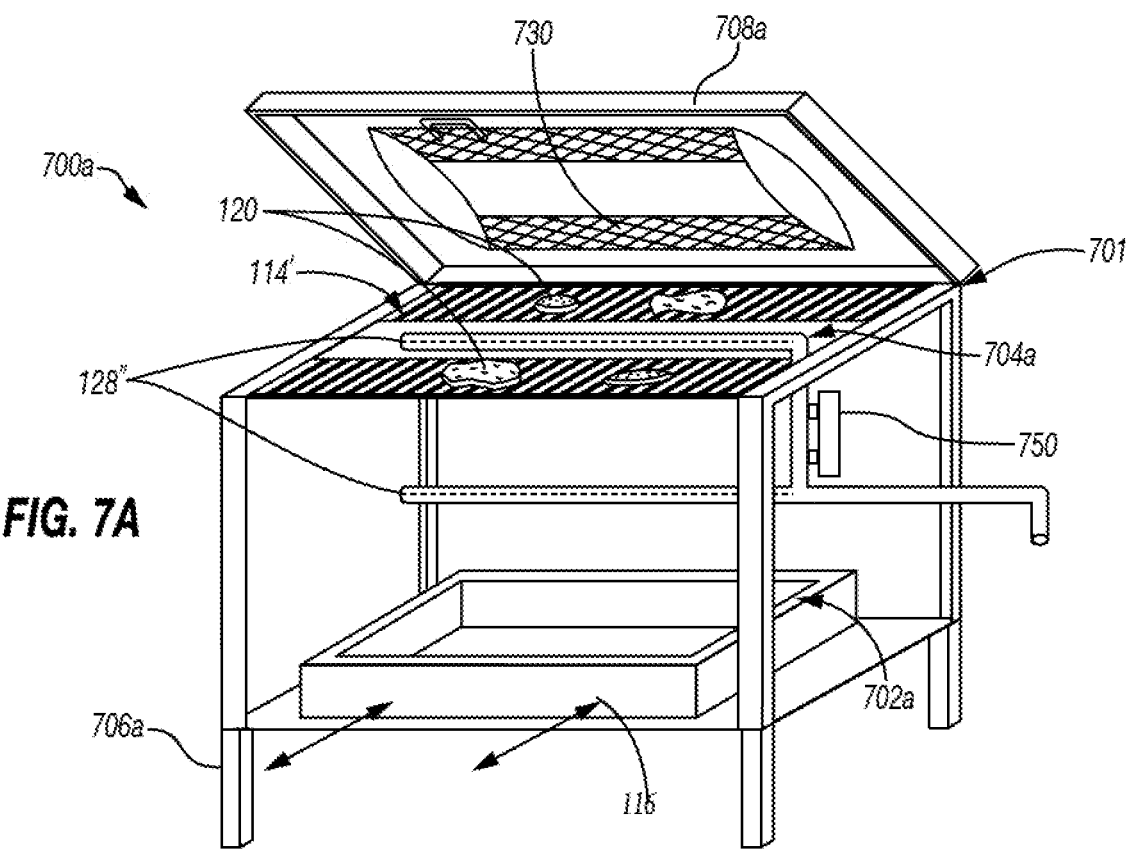
FIGS. 7A-7K are schematic diagrams depicting various examples the express BBQs.
Figure 7B:
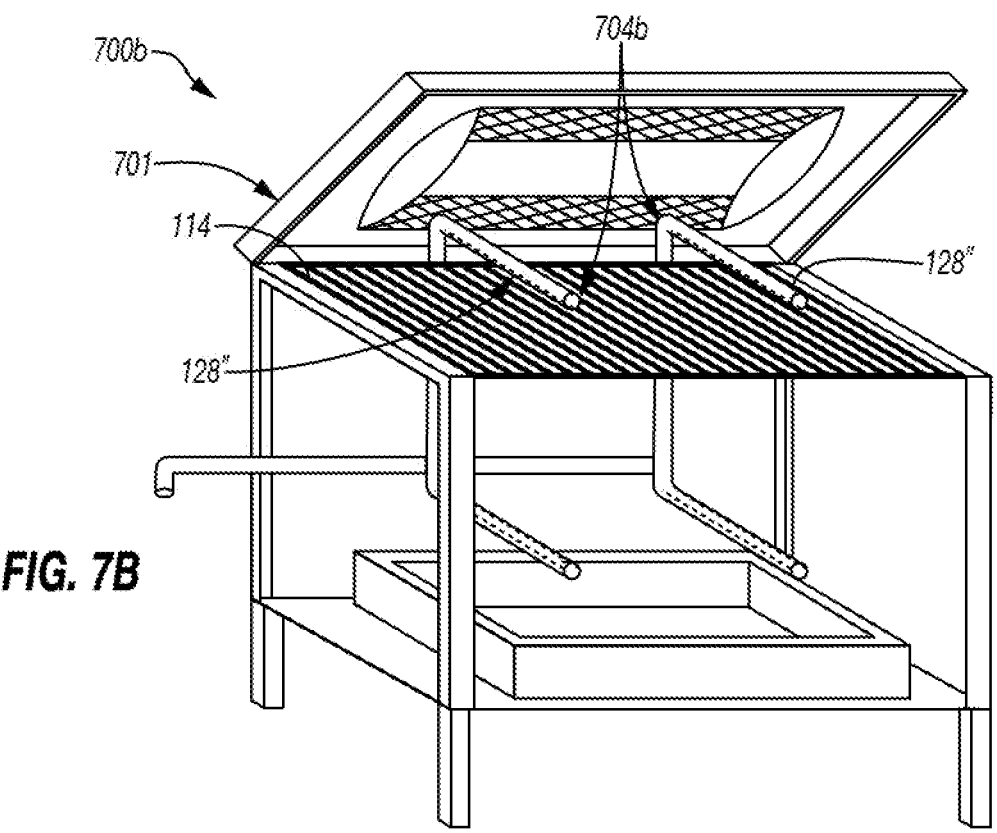

FIGS. 7A and 7B show a first design of a express BBQ 700*a, b* with a heat distributor 704*a, b* which functions with a dual (two) heat source (of fire and flames) with a "top and bottom" mechanism. In the version of FIG. 7A, the express BBQ 700*a* has a split grill 114' separated into two portions in a dual grill (net) design. This first design focuses on a "central fire design" where the heat and temperature comes from between portions of the split grill 114'.

The heat distributor 704*a* is positioned between the portions of the split grill 114' (dual net). The heat distributor 704*a* may be similar to heat distributor 504*e* of FIG. 5E and includes perforated pipes 128" having a vertical portion and a lateral portion extending from the vertical portion to pass the heat therethrough. In this version, the vertical portion of the pipe 128" is connected to a wall of the base 706*a* by a pipe frame support 750. Lateral portions of the pipe 128" are positioned above and below the grill 114'.

The heat distributor 704*a* passes heat from the heat source (not shown) and out the perforations of the perforated pipes 128" to provide heat above and below the food 120 and a offset a distance laterally away from the food 120. In this position the heat is distributed above and below the food 120, while the heat distributor 704*a* is positioned away from the food 120 to avoid drippings and splatter from the food 120. While not shown, the heat diverters (e.g., 130*a*) may be positioned about the perforated pipes 128" to divert the heat through the cooking chamber 110 as described, for example, with respect to 5E.

The express BBQ 700*a* may be installed with single or multiple sets of perforations along the perforated pipes 128" that may have multiple (e.g., two) directions for distributing heat. The express BBQ 700*a* may also be provided with additional perforated pipes 128 positioned about the express BBQ 700*a*. For example, one or more pipes 128 may be positioned about the bottom of the grill 114' and the others installed in the top part of the base 706*a* (frame) depending on the size of the housing 701. Both of the pipes 128" may be connected and operating from a separate or common heat source (e.g., gas tank or propane).

The express BBQ 700*a* is also provided with a heat diverter 730 positioned in the lid 708. The heat diverter 730 may be positioned over the grill 114' to shield the food 120 from heat exiting the heat distributor 704*a*. The heat diverter 730 may be positioned about the heat distributor 704*a* when the lid 708*a* is in the closed position. The heat diverter 730 may divert the heat exiting the perforated pipes 128" away from the food 120, for example, to prevent burning.

As also shown in FIG. 7A, the drawer 702*a* is depicted as including the drip tray 116 disconnected from and removable from the base 706*a* by pulling handles on the drawer 702*a*. The drip tray 116/drawer 702*a* is positioned below the grill 114' to catch the drippings from the food 120. Optionally, the grill 114' may be integrally connected above the drip tray 116 to form part of the drawer 702*a* as described, for example, in FIGS. 1A-1C.

In the version of Design 1 of FIG. 7B, the express BBQ 700*b* has single grill 114 with dual heat distributors 704*b*. Each of the dual heat distributors 704*b* are similar to the heat distributor 704*a*, except the dual heat distributors 704*b* are positioned about a rear wall of the housing 701 and spaced apart about the grill 114. The dual heat distributors 704*b* each have lateral perforated pipes 128" positioned above and below the grill 114. The perforated pipes 128" of the heat distributor 704*b* has a vertical portion connected to a rear wall of the base 106*a*.

While the design 1 of FIGS. 7A and 7B may be operated like a traditional BBQ grill with heat (fire) coming from the bottom only where the food may need to be flipped back and forth and rotated, the express BBQ 700*a* may also be operated with heat (fire) coming from both sides (e.g., top and bottom), thereby solving the issue of flipping the food (food/product) and also cutting down the cooking time because of the high direct level of heat to both sides. The food may be cooked in between both up and down sources of heat (e.g., flames of fire). This configuration may also be used to reduce the drippings (e.g., water/juice) that come out of the food 120 and which leak to the bottom of the base 706*a* and can cause smoke and burn.

This design 1 may cause the drippings that come from the top to be controlled so the food cooks from within because of the flame is on top of the food 120. This configuration may also provide heat distribution about the food 120 that reduces cooking time ranging anywhere from about 3 to about 10 minutes without having to flip the food 120. The design 1 of FIGS. 7A and 7B may also have the following features:

Part 1. One or more pipes 128 may also be assembled in the bottom of the base 706*a*. A designed lid (cover) 708*a* with a heat diverter 730 may be used to prevent the heat from directly burning the food, and to help bring out and direct the heat to an upper portion of the housing 701 (top).

Part 2. The pipe or pipes 128" connected to the gas tank/propane may be lifted to go on top of and above the grill 114 to heat to the food 120 from the top. This may be used to forgo flipping and/or rotating of the food 120 because the heat (fire/temperature) cooks from the top.

Part 3. The heat diverter 730 may be a layer connected to the lid 708*a* to help with the distribution of heat (to come down) as well as serving a frame protection purpose. A wider heat diverter 730 may be assembled above the pipe or pipes 128" similar to the heat distributor 430 of FIGS. 4 and 5B. The heat diverter 730 may be located within the lid 708*a* on in a top part inside the lid 708. The purpose of this special designed lid 708*a* with heat diverter 730 may be to help bring a level of heat down back to the food 120 and/or to protect the lid 708*a* from the heat.

Part 4. Depending on the design and size of the express BBQ 700*a, b*, the level of heat coming from the bottom pipe 128" and the top pipe 128" can be different. The designs may have thicker/thinner or longer/shorter pipes 128" in the bottom and top. Sometimes there might be more holes for the heat to come out of the upper and/or lower pipes 128". In other words, the designs may have more holes in the top pipe 128" than the bottom pipe 128" which will make the top part of the express BBQ 700*a, b* hotter than the bottom or the other way around (e.g., bottom hotter than the top) to provides a "temperature control" capability. This process of heat distribution may be used to perfect quality of the cooked food 120 as well as not having to rotate the food 120 or touch it while cooking.

Part 5. The grill 114' that the food 120 may be place on has a "separate and dual grill (net)" one on each side of the pipes 128". The middle part between the portions of the grill 114' may be empty which provides an open space above the pipe 128" located in the bottom. This may have several reasons, such as preventing the drippings coming out of the food from dropping onto the pipes 128" in the bottom which can cause smoke. Also, this placement helps keep the base 706*a* and the pipes 128" less dirty. This design may make it easier to take out portions of the grill 114' and clean it individually. Also for smaller portions of food one portion of the grill 114' may be used which means the second portion remains clean and untouched.

Part 6. To keep the bottom of the grill 114, 114' clean, a "drawer design" is provided to help keep the grill 114, 114' clean. The bottom part of the base 706*a* has the drawer 702*a* that covers the bottom of the base 702*a*. The drawer 702*a* opens and the surface can be taken out and washed and put back in to use again. Optionally, the drawer 702*a* may be opened and aluminum sheets put in the bottom so any drippings that drops into the drawer 702*a* falls on the aluminum which can be easily taken out and thrown away afterwards. This concept may be a way to keep the express BBQ 700*a, b* clean.

Another function of the drawer 702*a* may be to put water in the drawer 702*a* which means the bottom part of the express BBQ 700*a, b* may have water in it so any drippings that come out while cooking can drop into the water. This may eliminate a majority of the smoke that takes place during cooking because any form of dripping (e.g., fire, juice, grease, etc.) that drops down falls into the water in the drawer 702*a* and evaporates and disappears, making it to have less smoke and almost no smoke coming out. If drippings are left in a barbeque, left-over drippings (e.g., grease) can dry up and heat up when the barbeque is turned on to cook again, and can affect the flavor and quality of the food 120. The drawer 702*a* makes it possible to keep the bottom of the express BBQ 700*a, b* clean and free of smoke at all times, and may also prevent any extra smoke or past residual smells/flavors to come up.

Figure 7C:
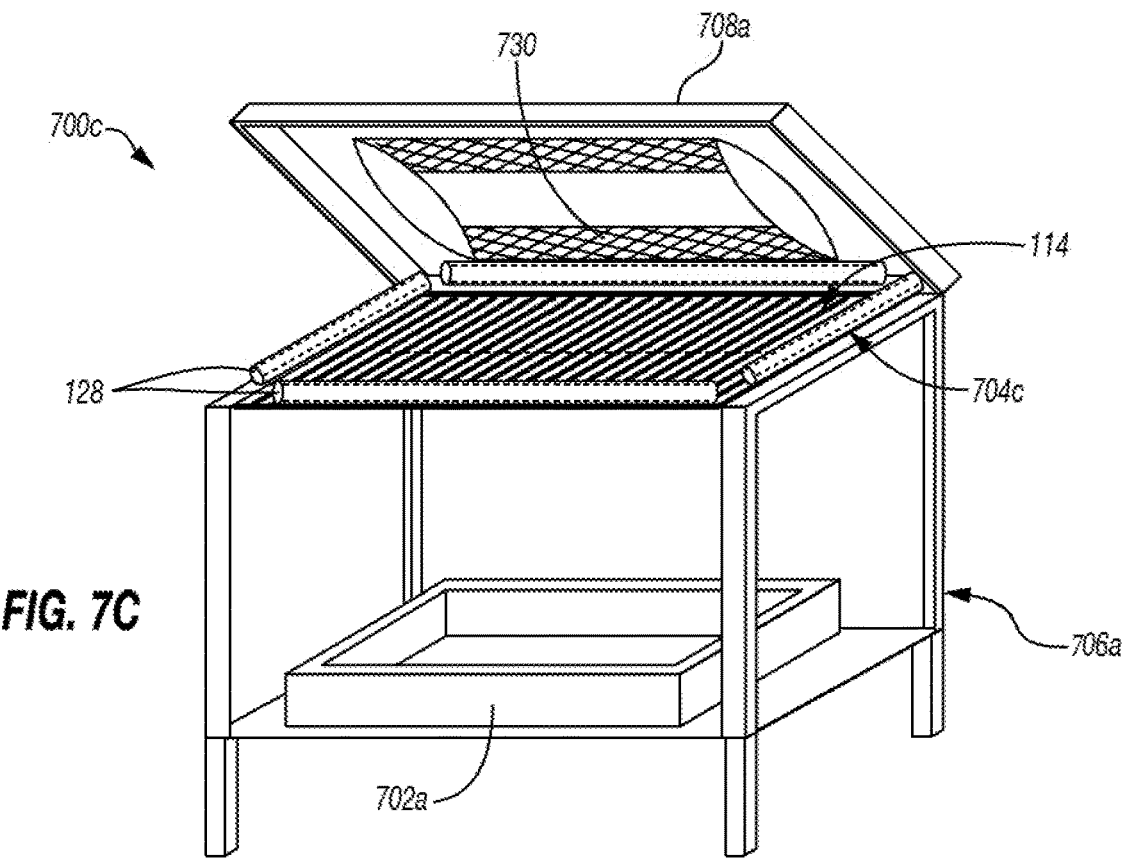
Figure 7D:
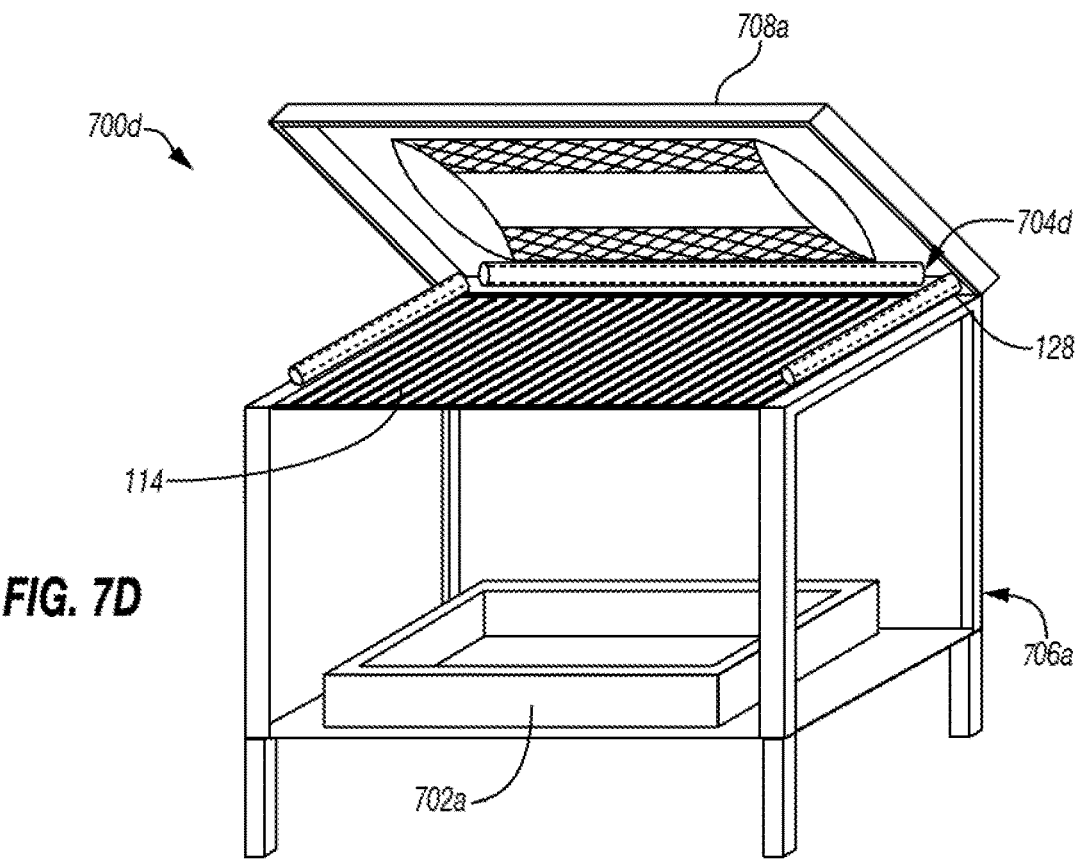

FIGS. 7C and 7D show a second design of the express BBQ 700*c, d*. This second design focuses on a "walled fire design" where the heat and temperature comes from the side walls. In the version of FIG. 7C, the express BBQ 700*c* has single grill 114 with an upper heat distributors 704*c* with pipes 128 positioned along each wall of the base 706*a* above the grill 114. In the version of FIG. 7D, the express BBQ 700*d* may similar to the heat distributor 704*c*, except that no pipe 128 is positioned along a front wall of the base 106.

Each of the perforated pipes 128 are positioned to emit heat about an upper portion of the housing 701 above the grill 114. This design has a combination of heat surrounding the grill 114 to reduce the cooking time because of the level of heat and the pipe/heat design. While not shown, each of the perforated pipes 128 may have a heat diverter to pass the heat upwards towards the lid as shown, for example in FIGS. 5A and 5B. Each of the pipes 128 may be coupled to a common or separate heat source.

Part 1. The heat distributor 704*c, d* and/or pipes 128 may have a design going on the side walls of the lower part of the base 706*a*. In other words, instead of heat coming from the middle as shown in FIGS. 7A and 7B, heat may be coming from the sides. The design provides pipes 128 along part or all of a periphery of the base 706*a* (e.g., along 2-4 sides). The pipes 128 may be individually connected or be one piece of pipe connected to the heat source to bring heat for a "walled heat design." The pipe 128 that is spreading heat may have perforations (holes) in the bottom and at the top to direct the heat to go both to the bottom of the grill 114 and top part of the grill 114 to help both sides cook without flipping the food. On the lower part of the perforations, the pipe 128 may have edges and/or heat diverters (e.g., 130*a* of FIG. 5A) to help circulate the heat to the bottom and distributing heat to the bottom of the food 120.

Part 2. The pipe 128 may be placed above the grill 114 in between the top of the base 706*a* and the upper part of the grill 114. The edge of the pipe 128 may be above the grill 114. Once the lid 708*a* is closed the heat diverter 730 within the top part of the lid 708*a* may be provided to control and bring the heat back down circulating to help the top part of the food 120 cook. This design may form a "walled heat design" environment used to provide a faster, less or no smoke and non-flipping process.

Part 3. The grill 114 may be a single grill that covers the entire lower area for food to be place on, or the dual grill 114' (FIG. 7A) may be used. The lower bottom part of the grill 114 may be cleared because there is no pipe 128 in a bottom below the grill 114 so the entire grill may be used with more space to place food. Also, the drawer 702*a* may be in the bottom of the base 706*a* with the drawer 702*a* coming out so the user can put aluminum or water in it.

Figure 7E:
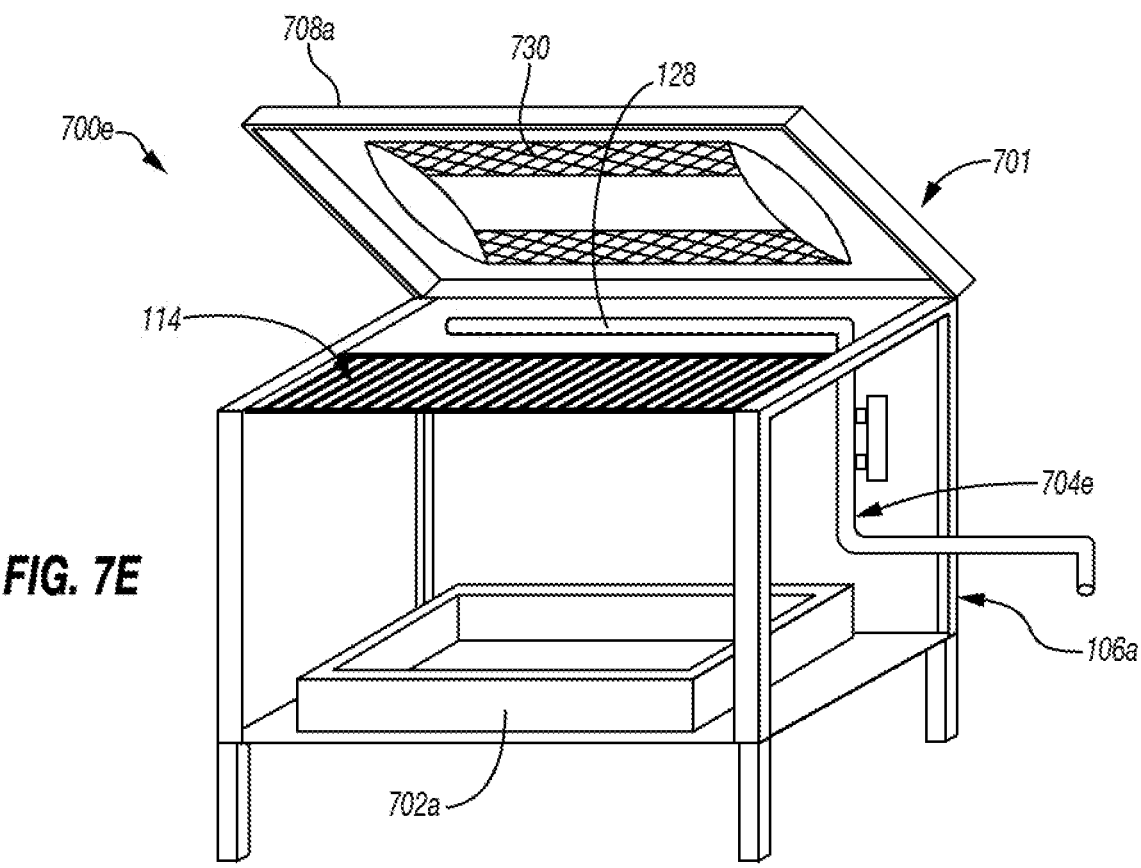
Figure 7F:
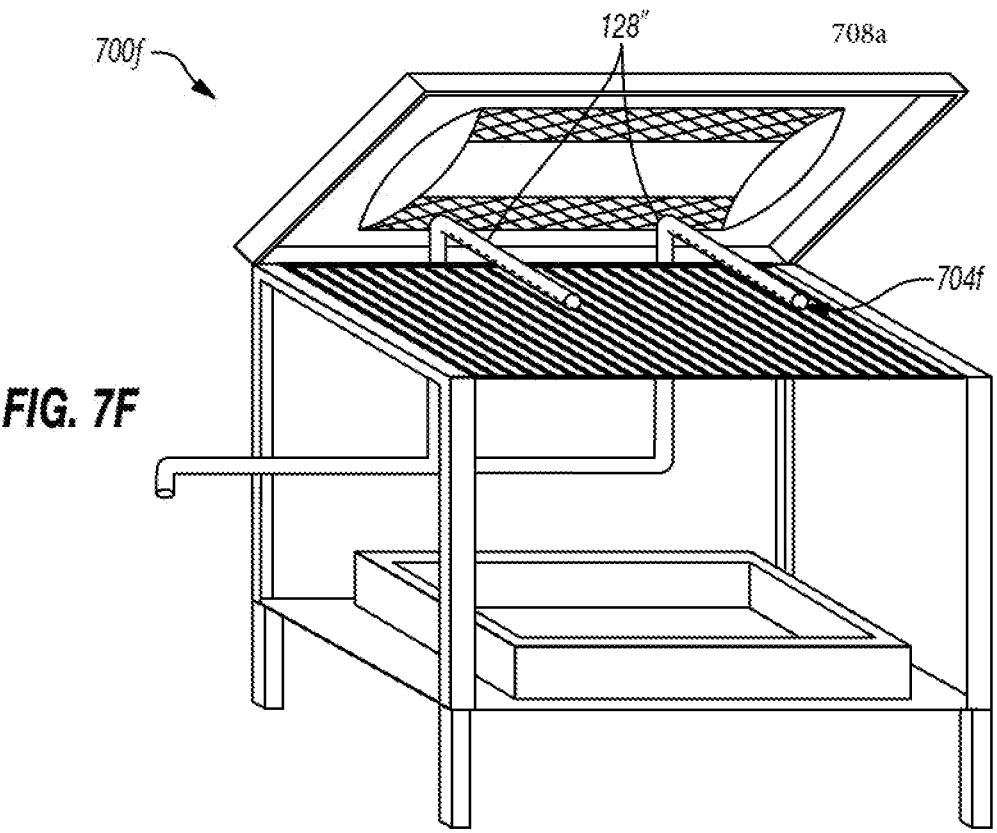

FIGS. 7E-7F show a third design of the express BBQ 700*e, f*. This third design focuses on an "upper heat design" where the heat and temperature come from above the grill 114. In this version of FIG. 7E, the express BBQ 700*e* has single grill 114 with an upper heat distributor 704*e* with a single pipe 128 positioned above the grill 114. In the version of FIG. 7F, the heat distributor 704*f* has a pair of pipes 128" positioned above the grill 114.

The perforated pipe(s) 128, 128" is/are positioned to emit heat about an upper portion of the housing 701 above the grill 114. The perforated pipe(s) 128, 128" may have a heat diverter (not shown) to pass the heat upwards towards the lid 708*a* as shown, for example, in FIG. 5E (430). The pipe or pipes 128, 128" located in the top of the grill 114 are positioned under the "special design lid" 708*a* with the heat diverter 730 above the grill 114. In this design, the temperature is coming from a top of the grill 114, but optionally may or may not also have heat coming from the bottom below the grill 114.

The lid (cover) 708*a* is designed to be placed on top of the pipes 128, 128" inside the lid 708*a* to help bring the heat down. This lid configuration may be used to reduce smoke, facilitate cleaning, and provided flavorful cooking. Also, the bottom part may be available space for putting the drawer 702*a* in a way to that drippings (any juice or grease that drops) falls down into the drawer 702*a*. The drawer 702*a* may have capability to put water or aluminum in it for an easy to clean concept.

Figure 7G:
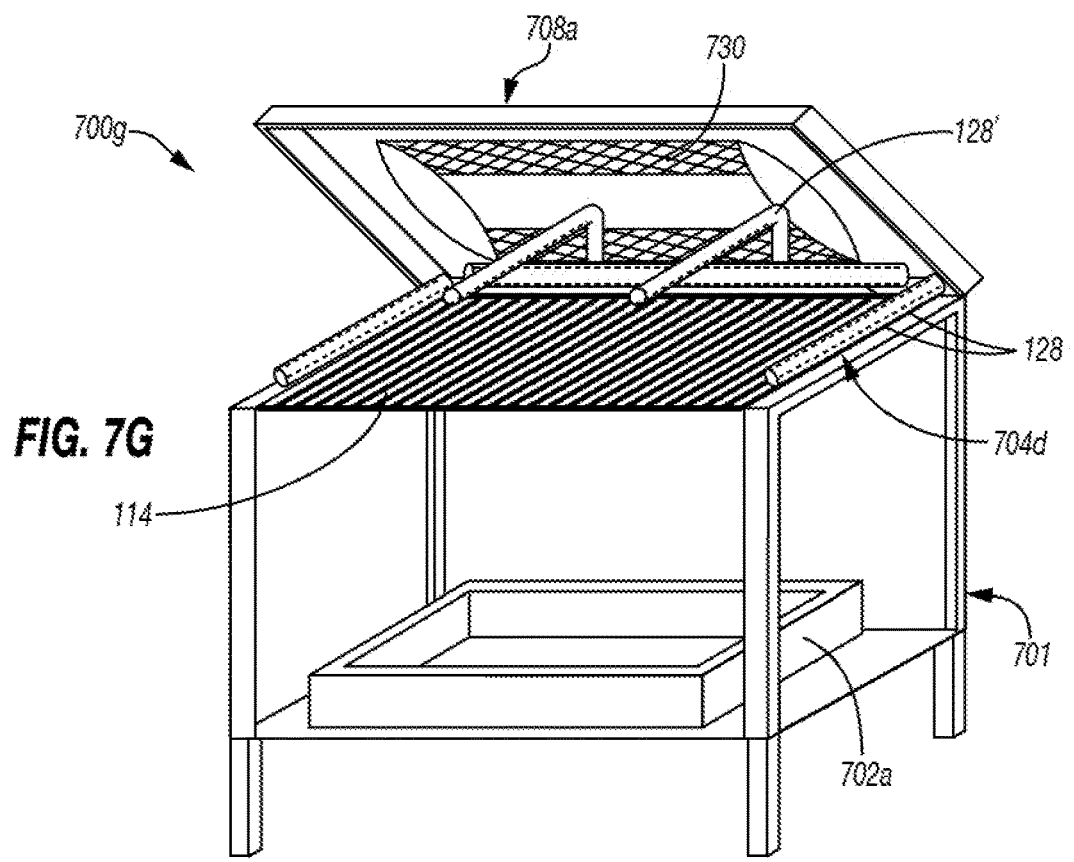

FIG. 7G show a fourth design of the express BBQ 700*e, f*. This fourth design focuses on a "combination heat design" where the heat and temperature comes from above the grill 114. In the version of FIG. 7G, the express BBQ 700*f* has single grill 114 with the heat distributors 704*d* of FIG. 7D and the heat distributors 700*f* of FIG. 7F.

Part 1. In this design, the upper pipes 128 use the "walled heat design" with the pipes 128 positioned along the side walls (as shown in FIG. 7D) bringing fire out from both bottom and top part of the holes which will distribute heat to the bottom and top of the grill 114. Optionally, heat may be coming from the bottom only of the pipes 128 (e.g., from lower perforations) giving heat to the bottom of the grill 114.

Part 2. One pipe or multiple pipes 128" may be located in the top part of the grill 114 (above the food 120) under the lid 708*a* and heat diverter 730. The heat may be coming from the top of the grill 114. When the lid 708*a* closes, the heat diverter 730 may be placed on top of the pipe 128" inside the lid 702a to help bring the heat back down to the food. This design is a combination of Design #2 (e.g., FIG. 7D) and Design #3 (FIG. 7F). This heat distribution design may be used to increase cooking speed of the express BBQ 700g. For example, depending of the food 120 cooked (e.g., type, shape, etc.), the food 120, such as chunks of meat, may cook from about 2 to about 8 minutes.

Part 3. The drawer 702a may be placed in the bottom with the capability of putting water or aluminum in it so any drippings drops that drawer 702a. This may eliminate extra smoke, and make it very efficient "easy to clean" concept. The drawer 702a may be in the bottom to have minimal smoke or no smoke in some cases. The design of heat from the "surrounding walls" by heat distributor 704d and the "upper heat design" by heat distributor 704f on top part of the grill 114 (on top of the food 120) may be used to seek faster cooking times without required "flipping or rotating the food".

Frame Designs and Structure: As in design 1 (FIG. 7A) and design 3 (FIG. 7E), different models, sizes and pipes 128, 128" may be used. In some designs, the pipes 128" instead of coming from the side (i.e., length design) may come from the back of the base 706a (i.e. width design) with the pipe 128" coming from the back towards the front. In other words, as shown in design #1 (FIG. 7A) where the pipe 128" is coming from the side in "the length" of the frame it may be coming from the back part of the frame in a "width" direction (as shown in FIG. 7B).

Due to spacing and size of the housing 701, 1 or more pipes 128" may be positioned about the sides or back of the base 106 and face toward a front of the base 106. Also, the structure of the pipe 128" that the heat exits in all designs can have a round or a flat shape. Depending on the size, design, and function of the express BBQ 700g, more or less heat may come from the bottom or top. The same principle of "heat distribution" may be used top to bottom. For example, one or multiple pipes 128, 128" may be positioned on top or bottom to give desired (e.g., higher) temperature depending of the size and/or need.

The designs of FIGS. 7A-7G may be used to make the process of barbequing more efficient with "faster cooking time" (e.g., from about 50 to about 70% reduction in time) compared to conventional barbeques, such as grills with coal positioned below an open grill. Also, the designs may use the 'no-flip' concept where the food cooks from both sides without having to rotate or touch the food while cooking. Because of the distribution and spreading of heat using the drawer system, smoke may be reduced from about 70 to about 90%, and some cases no smoke at all while operating. This may be due to the fact that both sides of the food are cooking at the same time and also any drippings coming out are dropping down to the drawer 702b which eliminates smoke. With the help of the "drawer system" the express BBQ may provide a clean and spotless process of grilling.

FIGS. 7H-7K depict additional designs of the express BBQ 700h-k. These designs are similar to the express BBQs 700a-g of FIGS. 700a-g, except with a grill (net) drawer 702b and a walled pipe design, and with some additional parts which may be used to make the cooking process more efficient and increase capabilities.

Figure 7H:
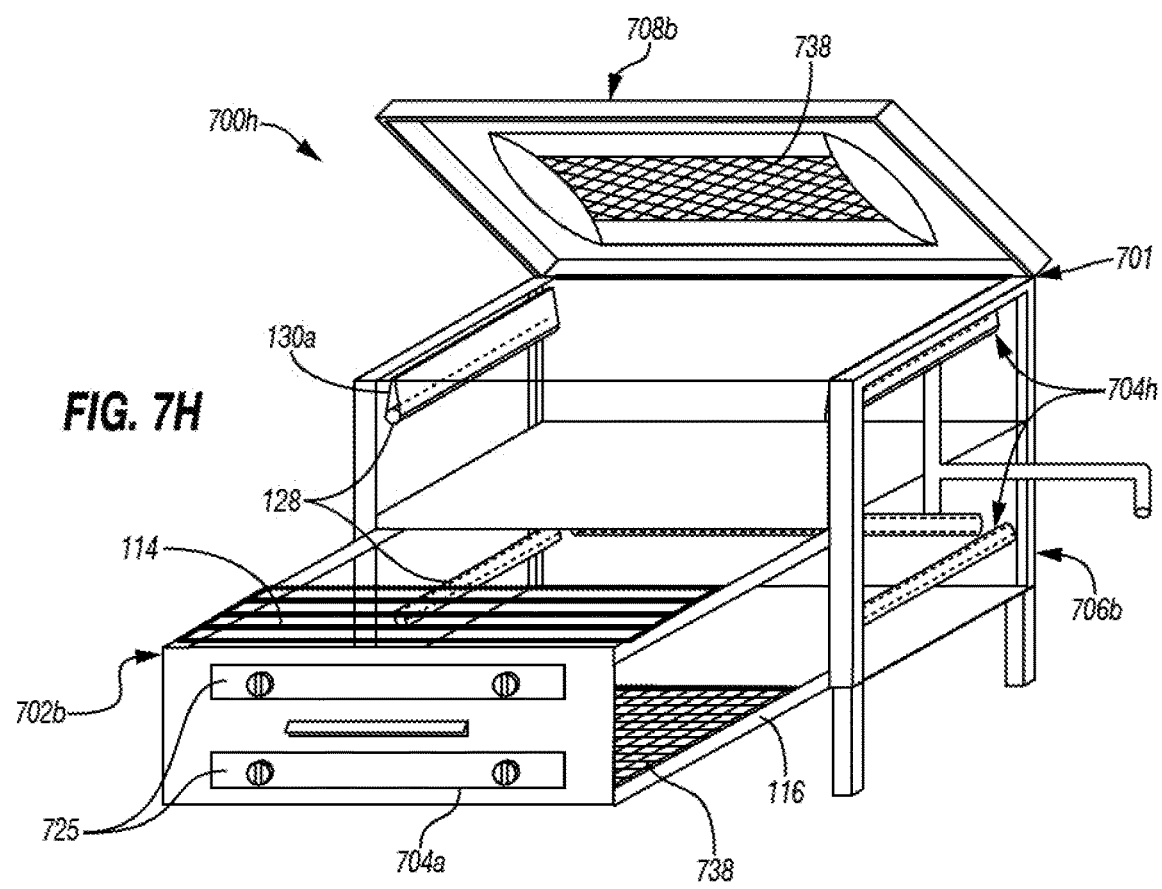

FIG. 7H shows a fifth design of the express BBQ 700h. This express BBQ 700h has a housing 701 with the drawer 702b extendable therefrom. The housing 701 has the lid 708b with the heat diverter 730 therein, and the base 706b shaped to receive the drawer 702b.

The express BBQ 700h also has upper and lower heat distributors 704h. The upper heat distributors 704h include the perforated pipes 128 positioned along each wall of the base 706b above the grill 114, and lower heat distributors 704h includes perforated pipes 128 positioned below the grill 114. The heat distributors 704h may have heat diverters 130a positioned about the perforated pipes 128 (see, e.g., FIG. 5A).

In the configuration of FIG. 7H, the drawer 702b has a grill 114 that may not be stationary. The grill drawer 702b may be slidably removable from the base 706b of the housing 701. The grill drawer 702b has an integrated grill 114 and drip tray 116. Food 120 may be placed inside the grill drawer 702b on the grill 114 and then slid into the housing 701 so it may be cooked. The drawer 702b may be opened to check and see if the food 120 is cooked or not. The drawer 702b may be opened without opening the lid 708b to check on the food 120. The lid 708b may optionally be open if desired.

The drawer 702b and the housing 701 may be shaped to allow the food 120 to be checked without exposing the heated environment inside the housing 701. Because the drawer 702b comes out while the housing 701 remains closed, heat, smoke, and splatter from the food 120 is retained inside the housing 701. The grill 114 may have the functionality to go in and out with the grill drawer 702b. So that the food 120 may be placed to start cooking, the drawer 702b may be opened, the food 120 placed on the grill 114, and the grill 114 slid back into the base 706b. Once the food 120 is cooked, the drawer 702b may be opened to take the food 120 out and then the drawer 702b slid back in.

The drawer 702b may be used to help keep the express BBQ 700h clean. The drip tray 116 of the drawer 702b is located in the bottom with the grill 114 connected to the drip tray 116 so that once the drawer 702b is opened, the drip tray 116 opens up as well with it. In this case, while removing or checking on the food 120, the drippings from the food 120 may fall into the drip tray 116 and/or the bottom drawer 702b and not the ground. A net 738 is also provided in the drawer 702b similar to the nets 338 of FIGS. 3A and 3B.

The drawer 702b has handles 725, and front and rear panels that connect the top and bottom portions of the drawer 702b (e.g., the grill 114 and the drip tray 116) together so they open together at the same time. For clarity, front panel 724a is shown, but the rear panel is not. This drawer 702b can be used with the express BBQs 700h of FIG. 7H and/or any other versions of the express BBQs herein.

The express BBQ 700h also has a two-story concept. One section of the heat distributor 704h (e.g., lower pipes 128) may give heat and help to cook the food from the bottom and the upper section of the heat distributor (e.g., upper pipes 128) from the top. The base 706b may have a protective wall lining the base 706b. The wall of base 706b as shown in FIG. 7H may be taller for positioning the pipes 128 below a top edge of the base 706b, for example, in this case the pipes 128 are on a middle part of an upper portion of the base 706b below a top edge of the base 706b and above the grill 114.

When the lid 708b is opened, the upper pipes 128 may be lower (recessed) out of the reach and placed a little deeper (lower) and provided with the heat diverters 130a (FIG. 5A) which act as a protective cover. These protective covers may be positioned about the perforated pipes 128 above the drawer 702b and about the surrounding walls of the base 706b. The upper pipes 128 may be surrounded inside that base 706b, with the lid 708b above this base 706b. The heat diverters 130*a* may form a protective wall which can be used in all designs herein to provide a more protective environment.

The lid 708*b* may have a shallow depth (or height between a top and bottom) and may be designed in a way that a portion of the base 706*b* is open. In the FIGS. 7A-7G, the walls of the base 706*a* are the same height to meet a bottom of the lid 702. In FIGS. 7H-7K, the front of the base 706*b* is shorter than the sides rear. The lid 708*b* has longer front to meet a top of the shorter front of the base 706*b*. In this lid 708*b*, the heat diverter 730 is also used to bring back down the heat to the food 120 (and it may still be connected to the lid 708). This lid 708*b* can be used in the other designs herein (e.g., FIGS. 7A-7G).

Another difference between FIGS. 7A-7G and 7H-7K relates to the position of the bottom pipes 128 of the heat distributors 704*a-k*. In FIGS. 7A-7G, the lower pipes are in the middle (center) of the base 706*a*. In FIGS. 7H-7K, the pipes 128 of the heat distributor 704*h* are along the surrounding walls of the base 706*b* in a walled pipe design so the lower pipes 128 are installed below the grill drawer 702*b*. The number of pipes on the bottom can be on 2, 3, 4 walls, depending on the size of the base 706*b*. Having the pipes 128 connected to the side walls of the base 706*b* may help to avoid the drippings falling on the pipes 128 during cooking, and instead falling into the drip tray 116 of the grill drawer 702*b* through an area in the middle of the base 706*b* that is empty. This can help and eliminate smoke because the middle is empty and drippings from the food 120 while cooking is not dropping on the pipes 128 and instead it is going directly into the drip tray 116 of the grill drawer 702*b*. The bottom walled pipe design can be used in any of the designs.

Another difference, from the design of FIGS. 7A-7G is the position of the top pipes 128 of the heat distributors 700*a-g*. In FIGS. 7A-7B, the top pipes 128 are connected to the walls of the base 706*a* above the grill 114. In FIG. 7H, the drawer 702*b* places the heat above the grill 114 in the walled pipe design similar to the bottom pipes 128 as explained in the previous section. In this case, there is a distance between the grill 114 and the upper pipes 128. The pipes 128 are placed in the middle of our the protective wall of the base 706 below the very top edge of the base 706*b*. These upper pipes 128 have the purpose to bring heat to the top of the grill 114. The lid design having the heat diverter 730 located inside the lid 708*b* brings the heat back down to the food 120 so the top of food 120 is cooked. In this case, the food 120 is being cooked from both sides at the same time with the help of the lower pipes 128 and the upper pipes 128. The number of pipes on top can be 2, 3, 4 depending on the size of the grill 114. This upper pipe 128 configuration can be used in any of our designs 1-5.

Other difference in the fifth design of FIG. 7H is net (mesh) 738 in the lid 708*b*. This net 738 may be similar to the net 438 of FIG. 4. The previous lid design of FIGS. 7A-7*g* was a without a net. In other words, in this new design the lid 708*b* has the net 738 within the lid 708*b*. When the lid 708*b* is closed and ready for operating, the lid 708*b* may be located on the top of the food 120 and has the purpose of bringing heat back down to the food 120. The purpose of the net lid 702*a* is to control the heat from the top so if the heat is stronger, weaker, etc. it won't burn the food 120 and there may be balance in cooking process. These nets 738 may have different designs and sizes depending on the actual grill 114 size and model. The focus and purpose of the net 730*b* may remain the same, which is to distribute heat properly to the food so it cooks to perfection. This net design can be added to any of the designs.

Another addition is the heat diverters 130*a* that act as fire protection system covers. These heat diverters 130*a* may be placed on top of the upper pipes 128 (see, e.g., FIGS. 5A-5E) to make it more safe and to control and direct the heat. For safety, once you open the lid 708*b*, the pipes 128 may be covered for protection so it won't be naked and out in the open. The shape and design of the heat diverters 130*a* may be configured to distribute the heat to the lid 708*b* to enter the net 738 so the heat may be brought back down to help and cook the food 120. The net design can be used in any of the designs.

Figure 7I:
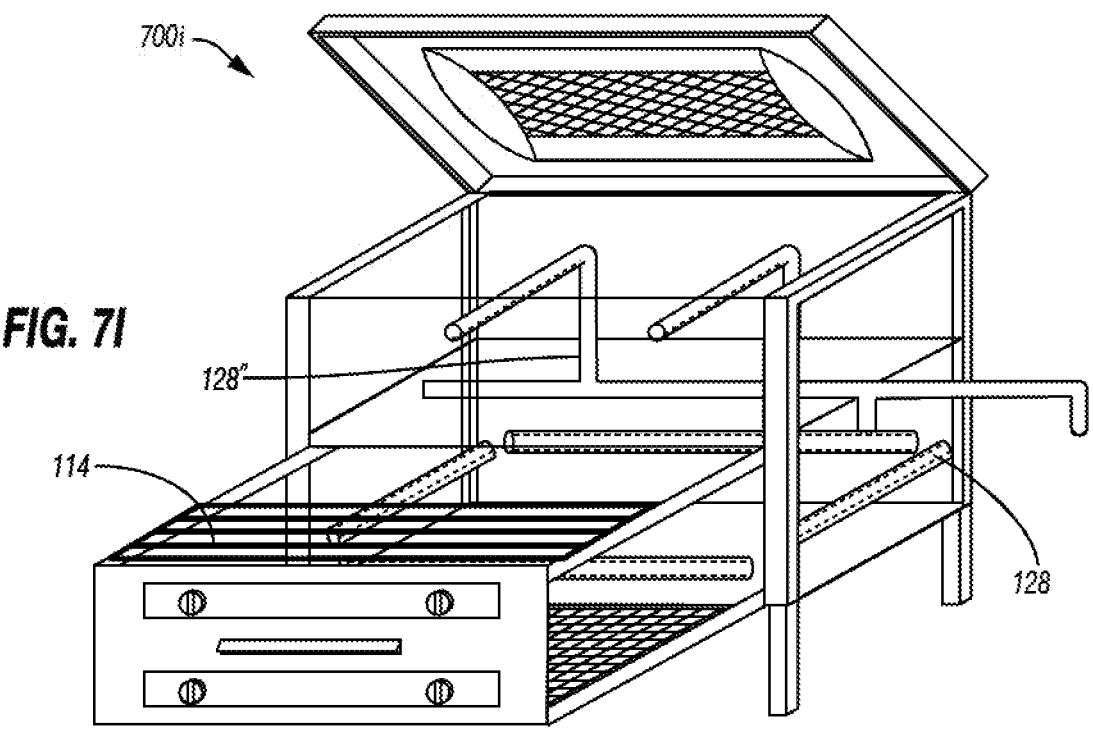

FIG. 7I shows a sixth express BBQ 700*i* with mixed upper pipes 128" and lower pipes 128. FIG. 7I may be similar to FIG. 8H, except that the upper pipes 128" of the fifth design of FIG. 7H are moved from the walls in the walled pipes design to another location. In the design of FIG. 7I, the upper pipes 128" are have portions extending laterally over the top of the grill 114 (similar to FIG. 7B) for giving heat from top to bottom. The lower pipes 128 are in the bottom similar to FIG. 7H, with an additional front pipe 128. The pipes 128, 128" may be connected to a common heat source as shown. The number of pipes 128 can be, for example, 2 or 3.

Figure 7J:
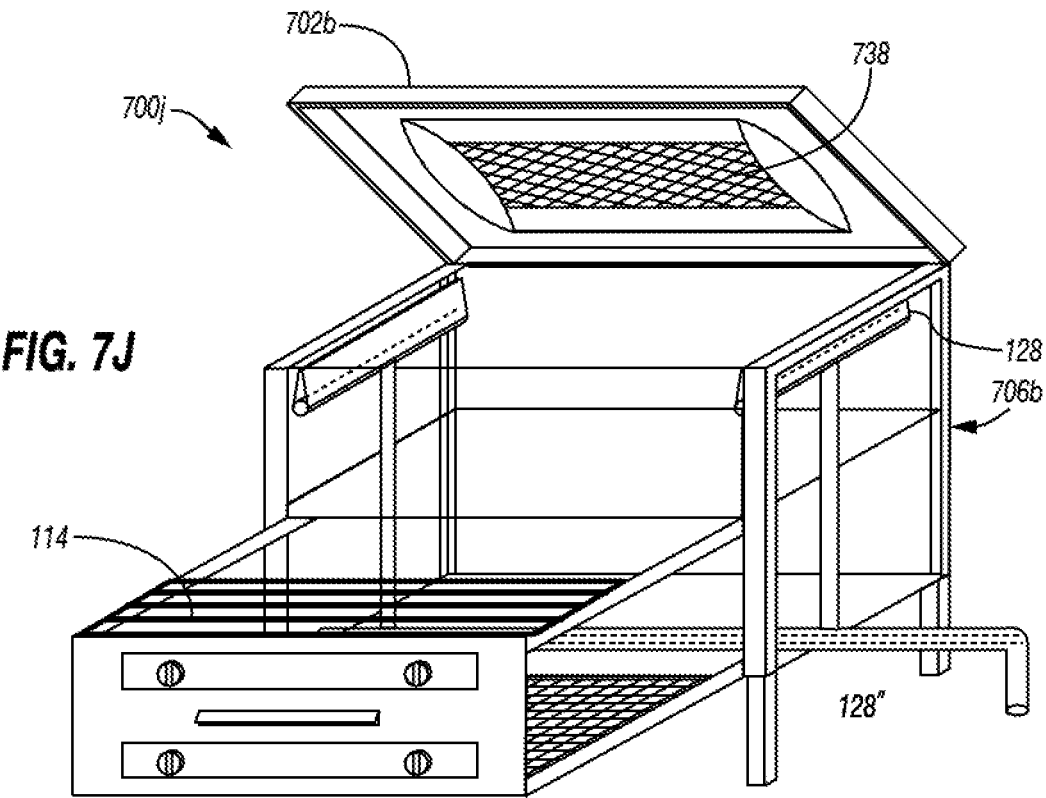

FIG. 7J shows a seventh express BBQ 700*j* with combined upper and lower pipes 128, 128". The upper pipes 128 of FIG. 7J is similar to those of FIG. 7H. The lower pipes 128 are similar to the bottom pipes 128 of Design #1 of FIGS. 7A and 7B, with the pipe placed in the middle of the base 706*b*. The lower pipes 128" extends along a middle part of the bottom of the base 706*b*, and is connected to the upper pipes 128 for giving heat from top to bottom.

Figure 7K:
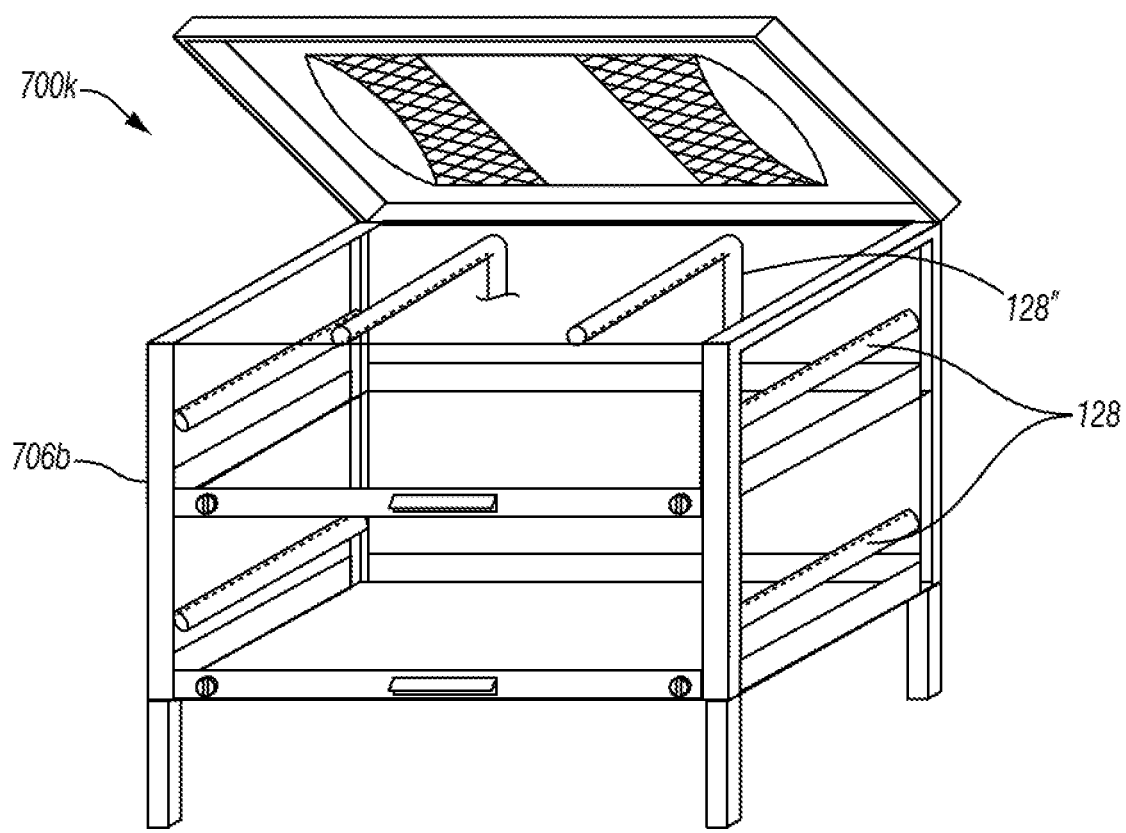

FIG. 7K shows an eighth express BBQ 700*k* with combined upper and lower pipes 128, 128". FIG. 7K is similar to FIG. 7H, except with the lower pipe 128 along the sides of the base 706 (a no lower pipe 128 on the rear of the base 706). Additional upper pipes 128" are also provided above the grill 114 and extend laterally over the grill 114 similar to the upper pipes 128" of FIG. 7G. The upper and lower pipes 128 are connected to the lateral pipe 128" along the back wall of the base 706*b*. In this eighth design, three levels of heat and pipes 128, 128" are provided including the walled upper and lower pipes 128 in the top and bottom of the base 706*b* (above and below the grill 114) similar to FIG. 7H. The additional pipes 128" are positioned on the top above the grill 114 with the pipes 128" coming from the top and giving heat from top to bottom as in the design 1 of FIGS. 7A and 7B. In other words, the top part of the pipes 128 in design 1 of FIG. 7A may be added to this eighth design.

Example Multi Express BBQs (Design 9)

Figure 8A:
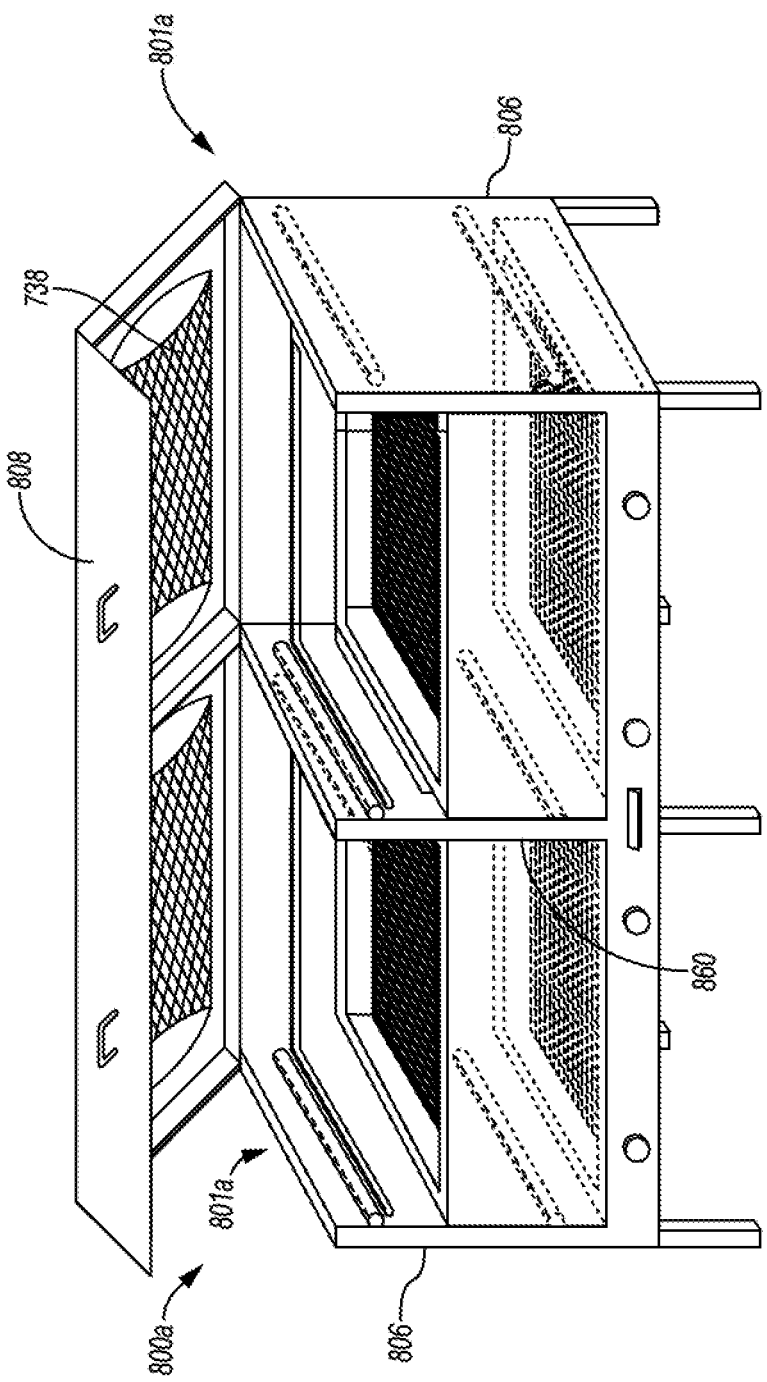
FIGS. 8A-8B are schematic diagrams depicting an example multi express BBQs.
Figure 8B:
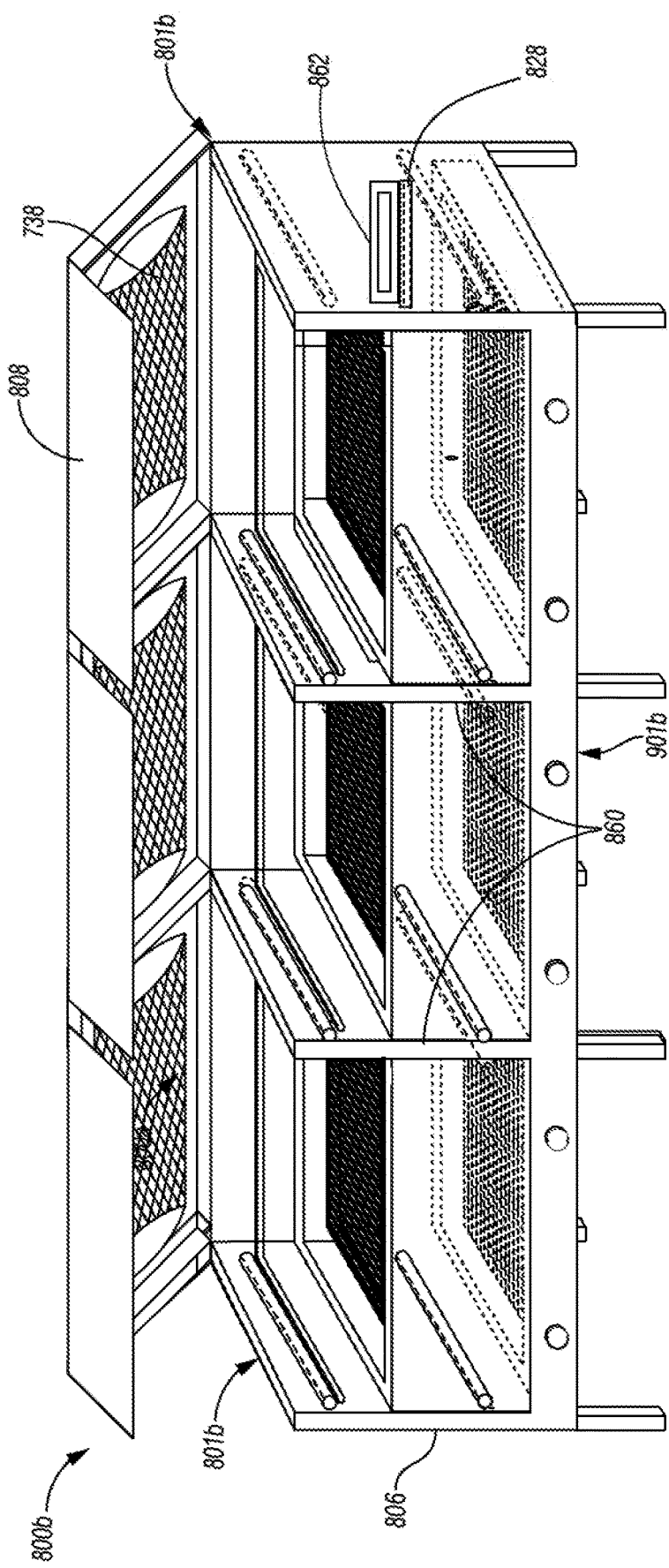

FIGS. 8A-8B show a multi express BBQ 800*a, b* in a multiple (or multi-frame or dual/triple frame) configuration which divides the grill into multiple (e.g., two or three) different sections. This multiple frame configuration may be used with a walled pipe frame and/or smoker drawer concepts described herein. In this ninth design, medium and large sized grills 114 have been divided into two or three sections as if there were two or three different grills combined within one housing 801*a, b*. In a medium design, two sections (or bases 806) are provided. In a larger sized design, three or more sections (or bases 806) are provided. A divider wall 760 is positioned between the grills 114 to separate each base 806 within the housings 801*a, b*.

As shown in FIG. 8A, the pipes 128 are connected with the heat coming out of them, and are installed on the walls of the base 806. Two pipes 128 are shown on each wall, one pipe in the bottom and one on the top part which is above the food 120 and the grill 114. A total of four pipes are shown in each base 806, two on the wall on the left and two on the wall on the right.

The middle part of the base 806 between the pipes 128 is empty so the drippings from the food 120 fall away from the pipes 128 with the heat is coming out of them. One purpose of this may be so that one pipe 128 in the base 806 cooks the bottom part of the food 120 and the other pipe 128 which is on top heats up the top of the food 120 and cooks the top. The heat from both sides allows cooking so that there is no need to flip the food 120 (i.e., making this a "non-flipping" express BBQ 800*a*. The divider wall 860 may also have one pipe 128 in the bottom and one pipe 128 on the top. In other words, four pipes 128 are in each of the bases 806.

As shown in FIG. 8B, a smoker pipe 828 may also be provided on the back wall of the base 806 with a "smoker drawer" 862 on top of it. The purpose of this pipe 828 and smoker drawer 862 is for the user to be able to put wood (and/or wood pallet) in it so the express BBQ 800*b* can become a smoker as well. Once the pipe 128 is turned on, then it will heat up the smoker drawer 862 which is above the pipe 128 and burn the wood. The smoke that is created may make that particular base 806 into a smoker. In other words, multiple (e.g., 2 or 3) independent bases 806 are provided in one housing 801*a, b*. The base 806 has at least two cooking pipes 128 on each wall, and may also have one pipe on the back wall which has the purpose of making part or all of the express BBQ 800*b* operate as a smoker.

Each of the bases 806 may have different configurations to allow cooking multiple (e.g., 3) different kinds of meals in one cooking session. For example, one base 806 may have chicken, another base 806 may have beef (e.g., a burger or steak), and yet another base 806 may have ribs being smoked at the same time. Each base 806 may has its own controller for individual heat settings.

The lid 808 may include multiple (e.g., two or three) independent doors, or it can have one large single lids 808 opens and closes as one piece. The express BBQs 800*a, b* of FIGS. 8A and 8B may also include the features of the other express BBQs herein (e.g., where the heat is distributed from top (to cook the top of the food) and bottom (to cook the bottom of the food)).

The bases 806 within the housing 801 may be used independently. While large grills may be used for cooking, a portion of the multi-grill design may be used for cooking smaller portions of food 120 on a smaller part of the grill 114 without heating up the entire housing 801. By using one of the independent grills 114 within one base 806 rather than the whole housing 801, this may save on fuel usage and make for an easier cleaning process since only one base 806 is used. Also, various foods 120 may be separated into different bases 806 and be cook separately. For example, all chicken can be in one base 806 and all the beef (steak) in the other base 806 cooking separately. This way, the smell of both foods won't be mixed up and cooking time for each of them can be set accordingly.

Also, the separate bases 806 may be used to assure that sufficient heat is generated by the heat distributors around the grill 114. The base 806 may be sized to conform to the heat generated by the heat distributors in the cooking chamber 110. The base 806 may need to be small enough to position the heat distributors in a location about the grill 114 such that sufficient heat is distributed within the housing 801 to cook the food.

In this ninth design, the pipes 128 may be arranged similarly to the fifth design of FIG. 8H with a total of four pipes 128 along the side walls of the base 806 (e.g., two pipes 128 on the top and two pipes 128 on the bottom. In other words, the walled pipe design of FIG. 7H may be in the bottom and the walled pipe design of FIG. 8A, B on the top. Also, in some designs, the drawer 702*b* of FIGS. 7H-7J may be used to allow the drawer 702*b* to be pulled out with the food 120 to check on the food 120 or to place or take out the food 120 and slide it back in. Some designs may have one single drawer 702*b* that comes out of all of the bases 806 together, and in some may have independent drawers 702*b* for each base 806 (i.e., different smaller drawers 702*b* for each base 806 (see, e.g., the food drawer 702*b* of FIG. 7H—the fifth design).

Like the fifth design of FIG. 7H, the lid 808 may have the net 738 to bring heat back down to the food 120. Also, in some designs, the multiple (e.g., double or triple) bases 806 may be designed differently with different pipe configurations. This means that each express BBQ 800*a, b* may have different designs in the bases 806. For example, one housing 801 may have two or three designs at the same time. This may because two or three bases within one housing 801 have different configurations. For example, the eight design of FIG. 7K with its pipe configuration may be in one base 806 and the first design of FIG. 7A or 7B with its pipe configuration may be in another base 806 on the other side of the divider wall 860. This provides multiple configurations in the same express BBQ 800*a, b*, each with individual configurations.

The lid 808 may open as one big door that opens the entire housing 801 and all of the bases 806. The lid 808 may have wall separators (not shown) which, once the lid 808 closes, further separate base 806. Also, one of the bases may have a charcoal design as is described further with respect to FIG. 9. This may provide the ability to use one or more of the bases 806 for charcoal cooking as well.

Features of all the designs herein, such as drawer, pipe, net, and/or any other features described herein may be combined as desired to provide a BBQ system that allows for two and three versions in one. Portions (e.g., bases 806) of the multi express BBQ 800*a, b* may be independent and may be designed differently. This provides the multi express BBQ 800*a, b* with multiple capabilities, thereby providing not just one, but two or three in one system.

Example Charcoal Express BBQs (Design 10)

Figure 9A:
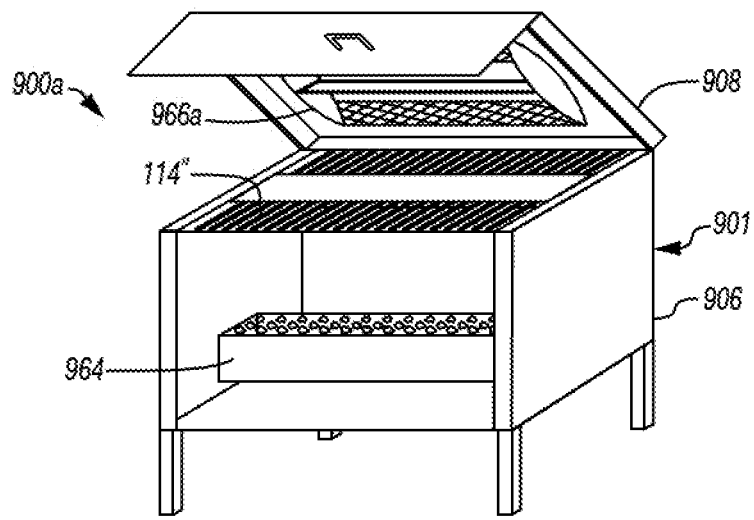
FIGS. 9A-9B are schematic diagrams depicting an example charcoal express BBQ.
Figure 9B:
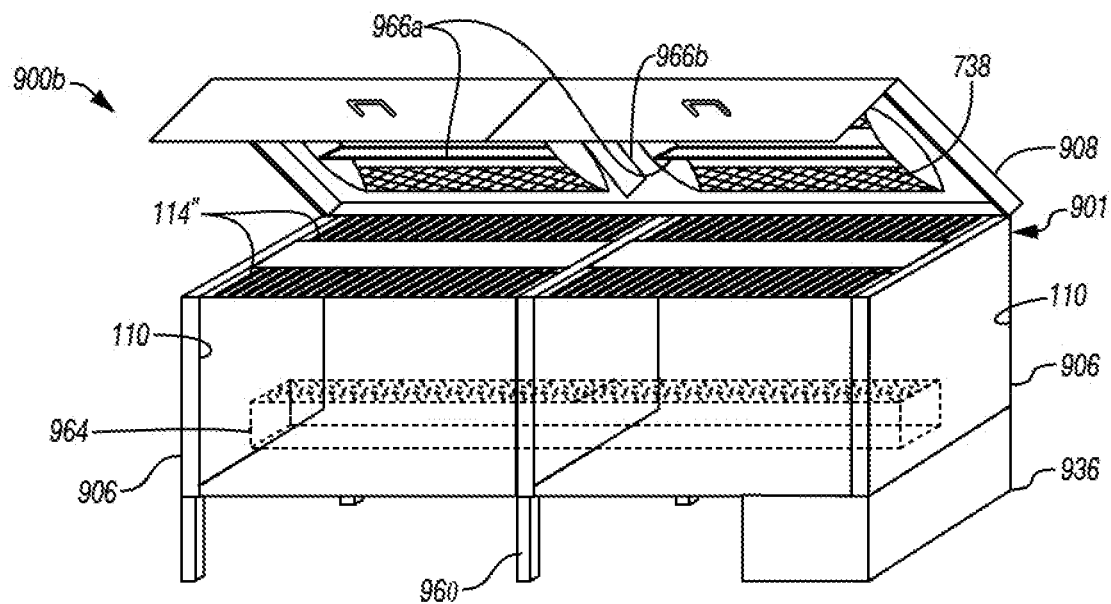

FIGS. 9A-9B describe a charcoal configuration of the express BBQ 900*a, b*. This tenth design includes a housing 901 with a base 906 and lid 908 and one or more split grills 114". This version also includes a charcoal tray 964 positioned below the split grills 114" and in a space between the split grills 114". While not shown, the base 906 may optionally be provided with drawers as shown in the other examples herein.

For this charcoal design, similar principles of other versions of the express BBQs 700*a-k* are used with charcoal. This system distributes the heat of the charcoal to both side of the food 120 so that rotation and/or changing sides of the food 120 is not required because it is cooking both sides at the same time. This version includes the no-flipping, an reduced smoke capabilities, increased/dual (e.g., upper/lower) heating, easy cleaning, captured drippings, and other configurations described herein. This version also reduces fuel, in this case charcoal, and may include the multi-grill configuration of FIGS. 8A-8B.

In this tenth design, the charcoal tray 964 is located in the bottom part of the base 906 below the grill 114". This charcoal tray 964 has a long narrow shape located in the middle of the base 906. Charcoal (e.g., conventional briquettes) is placed inside this charcoal tray 964. The charcoal tray 964 is positioned a distance from the front and the back wall of the base 906 with empty space therebetween (e.g., on both sides of the charcoal tray 964). This charcoal tray 964 is connected to opposite walls (e.g., between the side walls) of the base 906.

Above the charcoal tray 964 is the grill 114" which the food 120 may be placed on. The grill 114" is in the split grill design of FIG. 7A, with one portion in the front and one in the back. The space in between the portions of the grill 114" is empty. This empty space is above the charcoal tray 864. In other words, under both portions of the grill 114" is empty space so that when the food 120 is cooking the drippings do not drop into the charcoal tray 864 or onto the charcoal. This may eliminate the smoke and keeps the charcoal fresh and hotter in temperature.

On the lid 908, lid dividers 966a, b may be provided to separate portions of the lid 908. The lid divider 966a is positioned in a middle of the lid 908 going side to side. When the lid 908 closes, the lid divider 966a may come down and pass between the portions of the grill 114" and into the charcoal tray 964. The charcoal tray 964 may be separated by the lid divider 966a into two portions. This way the heat that is going up may be divided into two sections, one in a front portion of the base 906 about a front portion of the grill 114" and another in a rear portion of the base 906 about a rear portion of the grill 114". Heat may be controlled from the base 906 to the top of the food 120 by the design of the lid divider 966a installed on the lid 908.

As shown in FIG. 9B, the charcoal tray 964 may be used in a housing 901 with multiple bases 906. The charcoal tray 964 may also be divided in two sections to allow for cooking smaller amounts of the food 120 in one section without heating up the other section. Also, only a portion of the charcoal tray 964 in the base 906 may need to be filled, rather than the entire area in the base 906. Additionally, because the charcoal tray 964 is long and narrow, it may require less amount of charcoal. The charcoal tray 964 may be placed in brackets connected to the side walls (not shown) so the user can bring it closer to the top or bottom depending on how close they want the heat to be to the grill 114" and/or the food 120.

As also shown in FIG. 9B, the lid divider 966b may be positioned in a center of the lid 908 in a vertical direction, meaning from front to back. This lid divider 966b may be in a size that can pass through the grill 114" when the lid 908 is closed. The lid divider 966b may divide the charcoal tray 964 into two sections left and right. The lid divider 966b may connect to a base divider 960 in the base 906 to divide the housing 901 into two sections. Like the multi-express BBQs 800a, b of FIGS. 8A and 8B, the dividers 960, 966a, 966b may be used to separate the base 906 and/or housing 901 into sections for cooking smaller portions and using charcoal in one section of the housing 901. The lid 908 may also have the net 738 of FIG. 7A-K.

To maintain a clean base 906, the housing 901 may have a drainage system as in FIGS. 1C and 2. During cooking, the drippings fall into the base 906 (and/or drip tray 116—FIGS. 7A-7J) away from the charcoal to prevent flames, smoke and burning of the food 120. The charcoal tray 964 may be placed in the center between and away from the grills 114" so that the drippings drop into the bottom part of the base 906 and not on the charcoal tray 964. The base 906 may be shaped to direct the drippings to the side and into a disposal box 936. The disposal box 936 is placed under the base 906. An area of the base 906 directs the drippings while cooking into the disposal box 936. Once the charcoals need to be disposed, the charcoal tray 964 and a portion of the base 906 on top of the disposal box 936 may be bent/tilted to cause the charcoal to fall into the disposal box 936. This may be used to keep the base clean and grease free, and to allow removal of the disposal box 936 to empty it out by simply lifting one side.

The express BBQ 900a, b may be provided with other features, such as a food temperature (or thermometer) system that detects food temperature digitally with the need to open the lid 902 to check on the food. Within the base 906, the grill 114" may have a high quality bimetal oven safe thermometer (not shown) which may measure the temperature of the food 120 so the best results are achieved every single time. The thermometer may have a long tube frame going on top of the cooking net and the actual gauge of the screen may come out on the outside next to the temperature knobs. Once the food 120 is placed on the grill 114" to cook, the food 120 may be placed on the thermometer tube so essentially the tube pokes a hole into the food 120 so the tube of the thermometer is in the middle of the food 120 while cooking. This may be used to see the inside temperature of the food while it's cooking.

Depending on the size of the housing, 1 or more thermometers may be provided. For example, in the eighth design of FIG. 7K, 1 to 2 thermometers may be provided in each base 906 so that each base has independent measuring systems. Timers may also be provided. When the temperature of the food reaches a certain level, the heat may be adjusted (e.g., lowered and/or turned down) or an alarm system may be activated to notify the user.

Example Combination Express BBQs (Design 11)

Figure 10A:
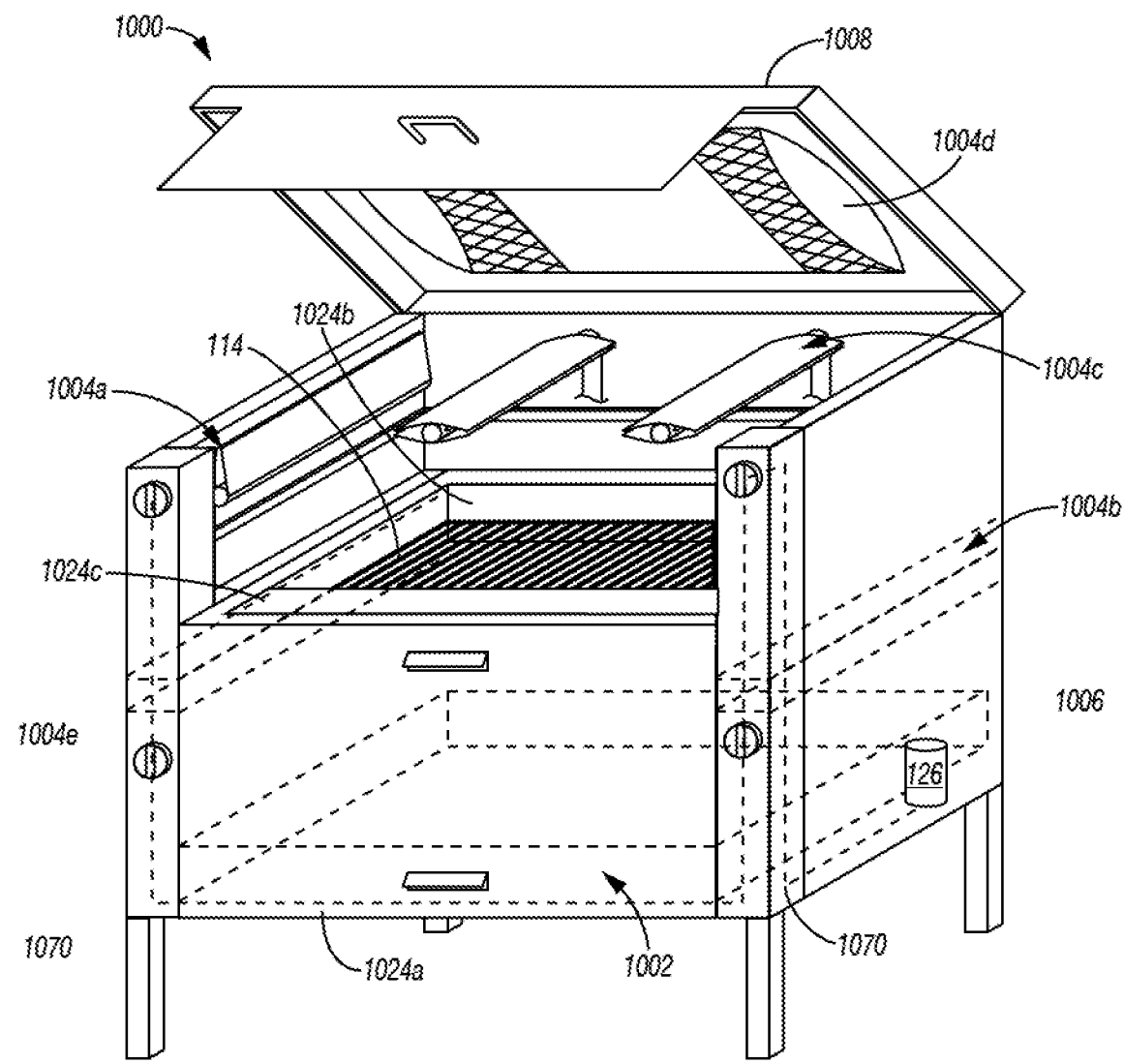
FIGS. 10A-10B is a schematic diagrams depicting views of an example combination express BBQ.
Figure 10B:
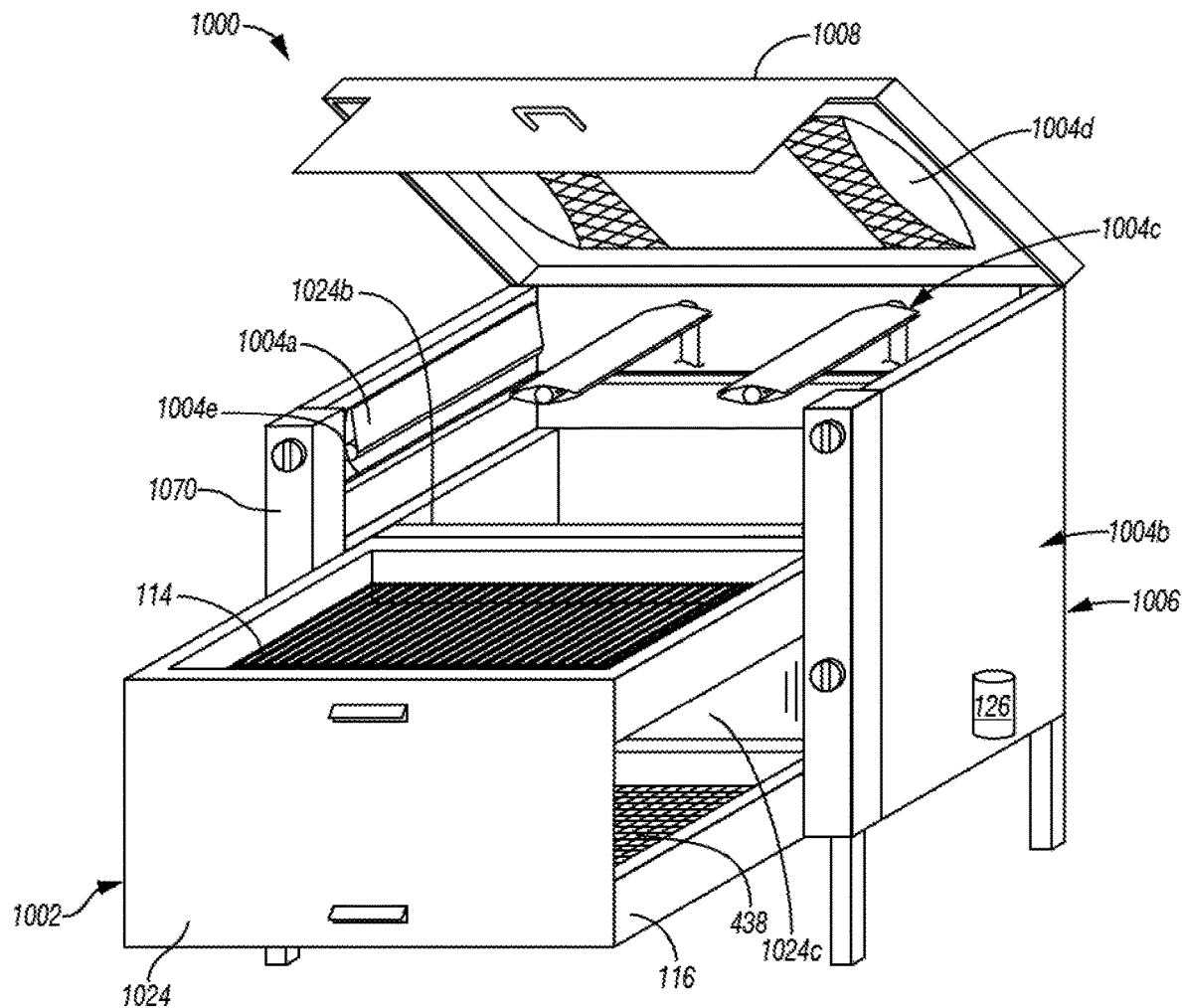

FIGS. 10A and 10B show another version of the express BBQ 1000 including multiple features described herein. This eleventh design shows a housing 1001 with a lid 1008 and base 1006, and with a two part drawer 1002 with front and rear 1024a, b, grill 114, and drip tray 116 similar to those of FIGS. 7G-7K. This combination also includes heat distributors 1004a-d which may be similar to the heat distributors 504a of FIG. 5A (see also the top walled pipe design of FIG. 7H), 504d of FIG. 5D (see also the bottom walled pipe design of FIG. 7H), 504e of FIG. 5A (see also the lateral pipe design of FIG. 7G), and 430 of FIG. 4 (see also the lid design of FIGS. 7G-7K7H), respectively.

FIGS. 10A-10B also show addition electrical heat distributors 1004e. This electrical heat distributors 1004e may be a conduit, such as a heat coil, positionable in the base 1006. As shown, the electrical heat distributors 1004e is positioned along the wall of the base below the heat distributors 1004a, b. The electrical heat distributors 1004e may optionally be connected by a plug to an electrical outlet for power, and/or to controls for selectively varying the heat generated therefrom. Depending on the operation, one or more of the heat distributors 1004a-d may be used alone or in combination with one or more of the heat distributors 1004e.

As also shown in this view, the base 1006 may be provided with vertical posts 1070 on each side of the front 1024c of the base 1006. The vertical posts 1070 to support portions of the flowline that couple to the heat source 126. The vertical posts 1070 have upper dials (or controls) 1072a coupled to upper heat distributors 1004a, c for selectively adjusting heat flow therethrough. Lower dials 1072b are coupled to the lower heat distributors 1004b for selectively adjusting heat flow therethrough. The flowlines as schematically depicted as extending from the posts to the heat source 126 supported on the base 1006. Other features described herein may also be used with the express BBQ 1000.

FIGS. 7A-10B show various features usable with the express BBQ. As also shown, various combinations of these features may be provided. Additionally, variations in the shapes, sizes, arrangements, order, etc. may be provided.

The above description is illustrative of the preferred embodiment and many modifications may be made by those skilled in the art without departing from the disclosure whose scope is to be determined from the literal and equivalent scope of the claims that follow.

While the embodiments are described with reference to various implementations and exploitations, it will be understood that these embodiments are illustrative and that the scope of the inventive subject matter is not limited to them. Many variations, modifications, additions and improvements are possible, such as various combinations of the features and/or methods described herein.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An express barbeque for cooking food, comprising:
   a housing comprising a base and a lid with a cooking chamber defined therein, the base having a front and a rear with sides therebetween;
   a grill positionable in the base to support the food, a food splatter area defined about the grill; and
   heat distributors positioned about the cooking chamber, each of the heat distributors comprising a perforated pipe and a corresponding heat diverter, each of the perforated pipes shaped to receive heat from a heat source;
   wherein each of the heat diverters comprises plates defining an inlet and an outlet a distance from the inlet, the heat diverter positioned on the perforated pipe to receive the heat from perforations in the perforated pipe;
   wherein the heat diverters are not integral with the housing;
   wherein a portion of the perforated pipes and the corresponding heat diverters of at least one of the heat distributors is above the grill and another portion of the perforated pipes and the corresponding heat diverters of at least one other of the heat distributors is below the grill; and
   wherein the outlets of the heat diverters of a portion of the perforated pipes are above the grill and the outlets of the heat diverters of another portion of the perforated pipes are below the grill to direct the heat from the perforated pipes through the cooking chamber above and below the grill whereby cooking of the food is facilitated.

2. The express barbeque of claim 1, further comprising a cooking drawer slidably positionable in the housing, the cooking drawer comprising the grill and a drip tray, the grill connected a distance above the drip tray by spaced apart front and rear walls.

3. The express barbeque of claim 2, wherein at least one of the lid and/or the drawer comprises a net positionable about the grill.

4. The express barbeque of claim 1, wherein the grill comprises grill portions with a grill space therebetween.

5. The express barbeque of claim 1, wherein the perforated pipes are positioned along the sides of the base.

6. The express barbeque of claim 1, wherein the perforated pipes are positioned along the front, rear, and/or sides of the base.

7. The express barbeque of claim 1, wherein the perforated pipes extend laterally from the base above, below, and/or between portions of the grill.

8. The express barbeque of claim 1, wherein each of the perforated pipes has the perforations along one or more sides and/or a top of the perforated pipe.

9. The express barbeque of claim 1, wherein the heat distributors comprise a lid heat diverter, an upper pipe heat diverter, a lower pipe heat diverter, and a lateral heat diverter.

10. The express barbeque of claim 1, wherein the heat diverters have a sidewall with a heat channel therethrough.

11. The express barbeque of claim 1, wherein the base has a drip outlet and wherein the base further comprises a drip receptacle in fluid communication with the drip outlet.

12. The express barbeque of claim 1, wherein the housing comprises multiple of the bases and a dividing wall separating the multiple of the bases.

13. The express barbeque of claim 12, wherein the multiple bases are different.

14. The express barbeque of claim 12, wherein the multiple bases are operable independently.

15. The express barbeque of claim 1, further comprising a charcoal tray positioned in the base.

16. The express barbeque of claim 15, wherein the grill comprises grill portions with a grill space therebetween, the charcoal tray positioned in the grill space, and wherein the lid comprises a charcoal divider, the charcoal divider separating the charcoal tray when the lid is in a closed position.

17. The express barbeque of claim 1, wherein the heat source comprises one of propane, gas, charcoal, electricity, infrared, and combinations thereof.

18. An express barbeque for cooking food, comprising:
   a housing comprising a base and a lid with a cooking chamber enclosed therein;
   a cooking drawer slidably retractable from the housing, the cooking drawer comprising a front wall and a rear wall with an upper grill and a lower drip tray therebetween, the lower drip tray connected below the grill to catch drippings therefrom; and
   heat distributors positioned about the cooking chamber, each of the heat distributors comprising a perforated pipe shaped to receive heat from a heat source and a heat diverter positioned about the perforated pipe to pass the heat from the perforated pipe through the cooking chamber whereby cooking of the food is facilitated;
   wherein each of the heat diverters comprises plates defining an inlet and an outlet a distance from the inlet, the heat diverter positioned on the perforated pipe to receive the heat from perforations in the perforated pipe;
   wherein the heat diverters are not integral with the housing;
   wherein a portion of the perforated pipes and the corresponding heat diverters of at least one of the heat distributors is above the grill and another portion of the perforated pipes and the corresponding heat diverters of at least one other of the heat distributors is below the grill; and wherein a front of the base is positioned between the front wall and the rear wall of the cooking drawer with the upper grill and the lower drip tray extending through the front of the base, the cooking chamber being substantially closed as the drawer moves between a closed position and an open position.

19. The express barbeque of claim 18, wherein the cooking drawer is slidably positionable through the front of the base.

20. The express barbeque of claim 18, wherein the cooking chamber remains sealed when the cooking drawer is between the open and the closed position.

21. The express barbeque of claim 18, wherein the perforated pipes are in fluid communication with each other.

22. The express barbeque of claim 18, wherein the perforated pipes are adjustably positioned about the base.

23. The express barbeque of claim 1, wherein the portion of the perforated pipes is above the grill and the another portion of the perforated pipes is below the grill.

24. The express barbecue of claim 1, wherein the portion of the perforated pipes with the outlets above the grill are positioned along a side of the base.

25. The express barbecue of claim 1, further comprising a lid heat diverter secured in a lid of the base and positioned above the grill when the lid is in a closed position.

26. The express barbecue of claim 25, wherein the outlets above the grill are positionable adjacent to the lid heat diverter to define a heat pathway above the lid heat diverter when the lid is in a closed position.

27. The express barbecue of claim 18, wherein the base has a drip channel and a drip outlet along a bottom thereof.

28. The express barbecue of claim 27, wherein the lower drip tray has a tray outlet, the drip channel aligned with the tray outlet as the drawer moves between an opened and a closed position.

29. The express barbecue of claim 18, further comprising a net positioned in the lower drip tray.

30. The express barbeque of claim 12, wherein the multiple bases are the same.

31. The express barbeque of claim 12, wherein the multiple bases are operable together.

32. The express barbeque of claim 18, wherein the perforated pipes are independently connected to the heat source.

* * * * *